United States Patent [19]

Stiles

[11] Patent Number: 5,594,863
[45] Date of Patent: Jan. 14, 1997

[54] METHOD AND APPARATUS FOR NETWORK FILE RECOVERY

[75] Inventor: Ian J. Stiles, Salem, Utah

[73] Assignee: Novell, Inc., Orem, Utah

[21] Appl. No.: 494,919

[22] Filed: Jun. 26, 1995

[51] Int. Cl.⁶ .......................... G01R 31/28; G06F 11/00
[52] U.S. Cl. .................... 395/182.13; 364/243.41
[58] Field of Search ................. 395/182.13, 182.14; 364/243.41

[56] References Cited

U.S. PATENT DOCUMENTS

| | | | |
|---|---|---|---|
| 4,164,017 | 8/1979 | Randell | 395/182.13 |
| 4,622,631 | 11/1986 | Frank | 364/200 |
| 4,713,755 | 12/1987 | Worley, Jr. | 364/200 |
| 4,755,930 | 7/1988 | Wilson, Jr. et al. | 364/200 |
| 4,819,159 | 4/1989 | Shipley | 364/200 |
| 4,858,111 | 8/1989 | Steps | 364/200 |
| 4,939,641 | 7/1990 | Schwartz | 364/200 |
| 4,989,134 | 1/1991 | Shaw | 364/200 |
| 5,097,409 | 3/1992 | Schwartz | 395/425 |
| 5,113,519 | 5/1992 | Johnson | 395/600 |
| 5,119,485 | 6/1992 | Ledbetter, Jr. et al. | 395/425 |
| 5,155,824 | 10/1992 | Edenfield | 395/425 |
| 5,157,663 | 10/1992 | Major et al. | 371/9.1 |
| 5,193,162 | 3/1993 | Bordsen | 395/425 |
| 5,202,969 | 4/1993 | Sato et al. | 395/425 |
| 5,218,695 | 6/1993 | Noveck | 395/600 |
| 5,257,370 | 10/1993 | Letwin | 395/650 |
| 5,261,051 | 11/1993 | Madsen et al. | 395/200 |
| 5,276,840 | 1/1994 | Yu | 395/425 |
| 5,276,867 | 1/1994 | Kenley | 395/600 |
| 5,295,259 | 3/1994 | Horne | 395/182.13 |
| 5,353,410 | 10/1994 | Macon, Jr. et al. | 395/275 |
| 5,386,540 | 1/1995 | Young et al. | 395/425 |
| 5,408,644 | 4/1995 | Schneider et al. | 395/575 |
| 5,452,447 | 9/1995 | Nelson | 395/650 |
| 5,488,731 | 1/1996 | Mendelsohn | 395/800 |
| 5,493,728 | 2/1996 | Solton | 395/250 |
| 5,504,883 | 4/1996 | Coverston | 395/600 |
| 5,513,314 | 4/1996 | Kandasamy | 395/182.04 |
| 5,542,066 | 7/1996 | Mattson et al. | 395/463 |

OTHER PUBLICATIONS

"Distributed Operating Systems", Tanenbaum, pp. 154–156, 245–307, Prentice Hall, 1995.

"Design and Implementation Details of the Windows NT Virtual Block Manager", Custer, *Microsoft Systems Journal*, Jul. 1995, pp. 67–79.

"Operating Systems Concepts", Silberschatz et al., Fourth Edition, pp. 43–45, 525–569, 646–647, Addison–Wesley Publishing Company, 1994.

"Netware 4 for Professionals", Bierer et al., pp. 585–607, 637–638, 643–645, New Riders Publishing, 1993.

"Leases: An Efficient Fault–Tolerant Mechanism for Distributed File Cache Consistency", Gray et al., pp. 202–210, *ACM*, 1989.

*Primary Examiner*—Robert W. Beausoliel, Jr.
*Assistant Examiner*—Glenn Snyder
*Attorney, Agent, or Firm*—Computer Law

[57] ABSTRACT

A method and apparatus for assisting in file recovery after a network fault uses a block state indicator in a client cache. After file data is stored in the client cache, the block state indicator is set to a client-cached state. After the file data is stored in a server cache, the block state indicator is set to a server-cached state. After the file data is stored in a nonvolatile store attached to the server, the block state indicator is set to a stored state. If the data in server cache is lost or compromised due to a network fault, the data maintained in client memory is retransmitted. In a similar manner, file locks and file semaphores are re-established after a network fault.

54 Claims, 13 Drawing Sheets

METHOD AND APPARATUS FOR NETWORK FILE RECOVERY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the recovery of files in a computer network after a network fault that alters the contents of a file server's memory, and more particularly to a method and apparatus for recovering file data, file locks, and file semaphores by using a client computer's cache after a network fault.

TECHNICAL BACKGROUND OF THE INVENTION

Personal computers or workstations may be linked in a computer network to allow the sharing of data, applications, files, and other resources. In a client/server network, the sharing of resources is accomplished through the use of a file server. The file server includes a processing unit that is dedicated to managing centralized resources and to sharing these resources with the personal computers and workstations, which are known as the "clients" of the server.

Each client includes a central processing unit ("CPU"), a memory which is directly accessible to the CPU, and one or more input/output ("I/O") devices such as a screen, keyboard, mouse, and the like. The client's memory may be battery-backed, but more often the memory is volatile memory (unbacked RAM) that loses data if power to the client is interrupted or if the client is rebooted. Some clients also have local non-volatile data stores, such as a local hard disk, while other clients have no local non-volatile store.

Each file server has a CPU, a volatile memory, various I/O devices, and at least one non-volatile data store. The non-volatile data store includes a controller and a non-volatile medium. To access the medium, the server's CPU sends read and write requests to the controller, which then attempts to carry out the request. Write requests are accompanied by file data which is destined for storage on the medium, or by a memory address identifying the present location of such data. Read requests are accompanied by a memory address which identifies memory destined to receive file data copied from the medium.

Thus, in the client/server network there are four locations that might reasonably be used to hold part or all of a file that is being used by a process which resides on a particular client: the server's non-volatile store, the server's memory, the client's non-volatile store, and the client's memory. Each location has relative advantages and drawbacks.

As noted, some clients do not have a local non-volatile store. Thus, the client store is not suitable for use as a necessary part of any general approach and will not be discussed further.

Storing file data on the server's non-volatile store is generally favored for several reasons. Placing file data on the server's store makes that data potentially accessible to all clients so that access is denied only as needed for security purposes. For this reason, the larger capacity stores in a network tend to be attached to the server, which in turn makes the server's store more attractive because more storage room is available (at least initially). In addition, keeping the file data on the server store prevents inconsistency because there is only one authoritative copy of the data.

However, placing all file data on the server's store typically decreases network performance. Before the client can read the file data, the data must be transferred by the controller from the non-volatile medium into the server's memory, and then the data must be transferred over the network to the client's memory. Both transfers take time. In particular, the transfer from non-volatile store to server memory tends to be very slow when compared to the time needed to read the same data from memory. Write operations incur similar delays.

Accordingly, many known systems "cache" file data by keeping a copy of the data in a region of the server's memory known as the "server cache." If a client reads data that happens to be in the server cache, no additional transfer from the non-volatile store is needed. Likewise, if a client writes file data that corresponds (i.e., is destined for the same position in the file) to data in the server cache, the new data can be simply written to the server's memory. The new data must be written to the non-volatile store eventually, but that transfer can be delayed until a later time if the controller is busy at present. The server can still avoid inconsistencies by coordinating its memory and non-volatile store usage to ensure that clients see only the most current copy of the data.

However, caching data in the server's memory does not eliminate the need to transfer that data over the network between the client and the server. The only way to eliminate the network transfer is to cache the data in a portion of the client's memory known as the "client cache." Unfortunately, client caching creates inconsistent versions of the cached data.

Consider the situation in which client A and client B each read the same data from the server into their respective client caches and then each modify the data differently without either client being informed that the other client is also modifying the data. If client C then reads the data from the server, C will get the old version instead of getting one of the more recent versions. Moreover, when the modified data is written back to the server for storage, the version that happens to be written last will overwrite the version that was written first. Thus, if A's data is written last, then B's changes will be lost and B will not be informed of the loss.

One solution is to claim exclusive control of the file or of the relevant portion of the file. This may be accomplished by locking the file so that only one client (or process) at a time is allowed to write to the file. If several files are needed, they may be claimed on an exclusive basis by setting a file semaphore. Thus, B may claim the file by locking the file or by setting the semaphore, make its changes, and then release the file by unlocking the file or by clearing the semaphore, as appropriate. A may then claim the file, overwrite B's changes, and then release the file. B's changes are still lost, but notification of the loss can be performed in connection with the file lock or semaphore operations so that B is informed. Moreover, a log of the changes can be maintained so that earlier versions of the data can be recovered at need. The log is updated each time the file is locked or unlocked, and each time a semaphore claiming the file is set or cleared.

Another approach to preventing inconsistencies caused by client caching is to force write requests all the way through to the server store each time they are made. Under this "write-through" approach, a process that writes data to the client cache is suspended until the controller commits the data to the non-volatile medium on the server and sends an acknowledgement of that committal back to the client. After the acknowledgement arrives, the process resumes and the region of client memory used to cache the data is considered free for other uses.

Thus, write-through minimizes the loss of data that is cached in the server but not yet committed to the store by preventing data from remaining in the server cache any longer than absolutely necessary before storage. Write-through allows logs and notifications similar to those associated with file locks and semaphores. Write-through also eliminates inconsistencies by placing all file data in one authoritative copy on the server's store.

However, because write-through effectively eliminates caching for writes, it may significantly decrease network performance. Suspending the process while waiting for the network and controller transfers to complete often increases the time required for the process to finish because the process could have been doing other work while these transfers were proceeding. Write-through also tends to increase the number of network and controller transfers. Under a cached approach, for instance, overwriting the same region of the file five times could result in the transfer of only the most recent copy of the data, whereas write-through would cause five network transfers and five transfers to the non-volatile store.

To improve system performance, some approaches consider the file data "written" as soon as the data reaches the server cache. Thus, the process is suspended only for the time needed to transfer the data across the network and to transfer an acknowledgement back to the client. The process is not forced to wait for an acknowledgement that the data has been transferred to the non-volatile medium. Likewise, the portion of client cache holding the data is considered free for re-use as soon as the server acknowledges receipt of the data.

However, treating data as written once it reaches the server cache leaves the data vulnerable to network faults. Network faults may occur as a result of hardware or software problems. Some network faults cause the server to reboot in the midst of a client process, thereby destroying any data in the server cache. Such data is lost if it has not yet been transferred from the server cache to the server store. Rebooting also eliminates file locks or semaphores held by the client.

Other network faults occur when a cable between the client and server is disconnected. The server regularly "pings" the client to determine if the client is still attached to the server. If the client does not respond to the server's ping after some predetermined period of time, the server logs the client off. From the client's point of view, being unilaterally logged off by the server causes many of the same problems as having the server suddenly reboot.

If the client treats data in the volatile server cache as being effectively written to the non-volatile server store, the client will not be informed after the cached data is damaged or lost. The client may even subsequently overwrite the only remaining copy of the data, which is in the client cache.

File locks and semaphores that are recorded only in server memory are also damaged or lost when a network fault occurs. The client process must either reconstruct the current locks and semaphores and then re-establish them with the server, or else lose the needed exclusive control. Unfortunately, many existing applications are not constructed to maintain an internal copy of the current locks and semaphores, nor are they constructed to restore those locks and semaphores after a network fault. As a result, locks and semaphores are not restored, files are corrupted, and data is lost.

In summary, considering data written once it reaches the server cache improves performance but leaves the data vulnerable to network faults that alter server memory. Using the write-through approach provides file integrity and reduces or eliminates data loss, but does so at a heavy performance cost. Both approaches leave client data vulnerable to the loss of file locks and semaphores.

Thus, it would be an advancement in the art to provide a method and apparatus for restoring file data after a network fault while still obtaining the performance benefits of caching data during at least some write operations.

It would also be an advancement to provide such a method and apparatus which assists in properly restoring the current file locks and semaphore settings after a network fault.

Such a method and apparatus are disclosed and claimed herein.

BRIEF SUMMARY OF THE INVENTION

The present invention provides a method and apparatus for assisting in file recovery after a network fault. Unlike conventional approaches, which do not recover file data and related information from the memory of a client machine after a server connected to the client reboots, the present invention marks data as "grey" when it reaches the server's cache and as "clean" when it reaches the server's non-volatile store. Grey data is retransmitted to the server after a network fault.

Data can also be written-through to the server store, with the application that requests the write-through being suspended until it receives an acknowledgement that the data is safely stored. One write-through method of the present invention allows the application to continue before the acknowledgement by preserving a copy of the data in the client cache until the acknowledgement arrives.

File locks and semaphores for files and other network resources are likewise maintained in the client's memory so that they can be restored after the server recovers from the network fault. In this manner the present invention provides a method and apparatus for restoring files after a network fault while still obtaining the performance benefits of caching data during at least some write operations.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
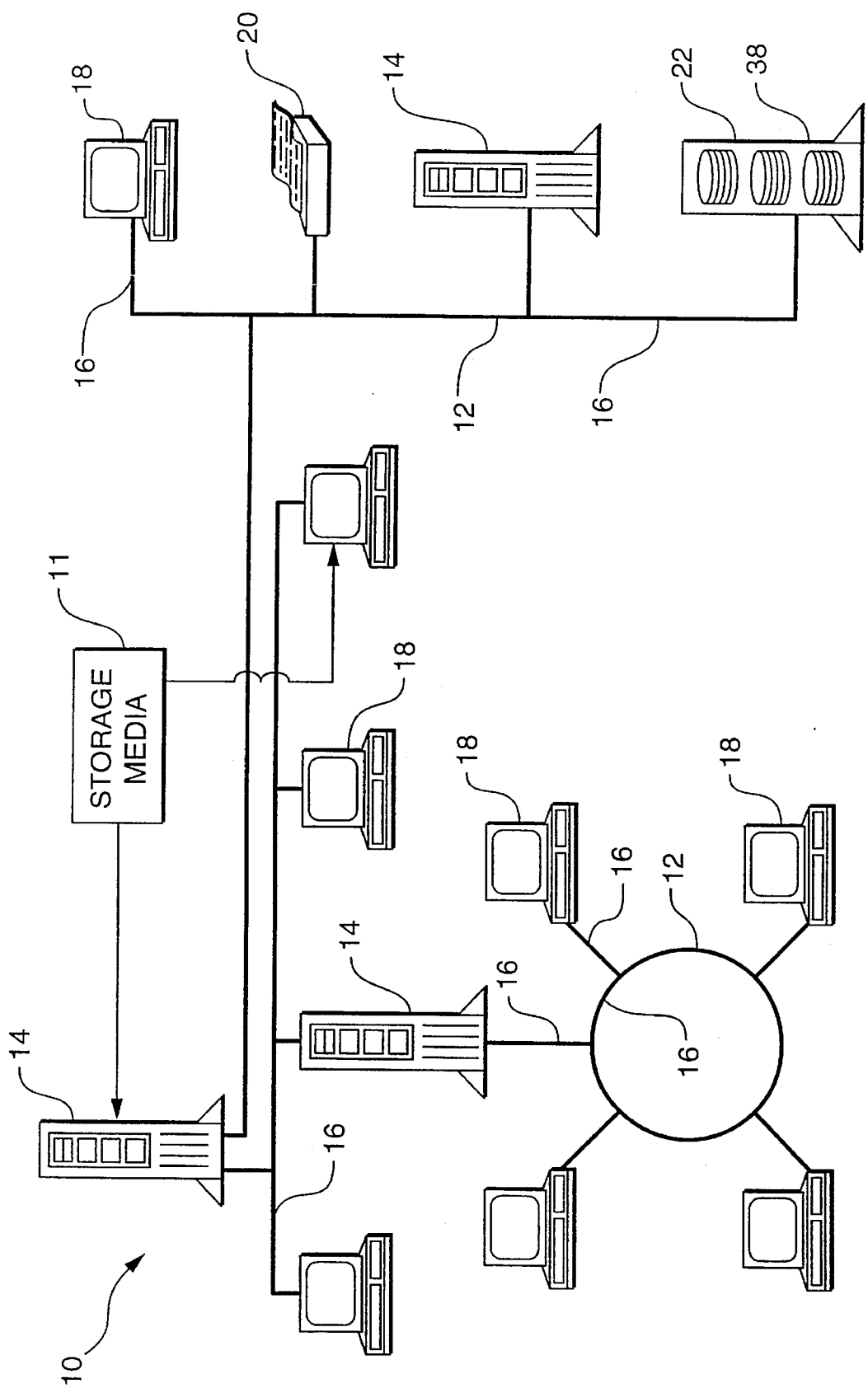
FIG. 1 is a schematic illustration of a computer network.

Reference is now made to the figures wherein like parts are referred to by like numerals. The present invention relates to a method and apparatus for assisting the recovery of files in a computer network after a network fault occurs. One of the many networks suited for use with the present invention is indicated generally at 10 in FIG. 1. In one embodiment, the network 10 includes Novell NetWare® software, version 4.x (NetWare is a registered trademark of Novell, Inc.). The illustrated network 10 includes several connected local networks 12. Each local network 12 includes a file server 14 connected by signal lines 16 to one or more clients 18. The clients 18 include personal computers and workstations. The signal lines 16 typically include twisted pair, coaxial, or optical fiber cables, but may also include transmission means such as telephone lines, satellites, and microwave relays. A printer 20 and an array of disks 22 are also attached to the network 10. Although a particular network 10 is shown, those of skill in the art will recognize that the present invention is also useful in a variety of other networks.

Figure 2:
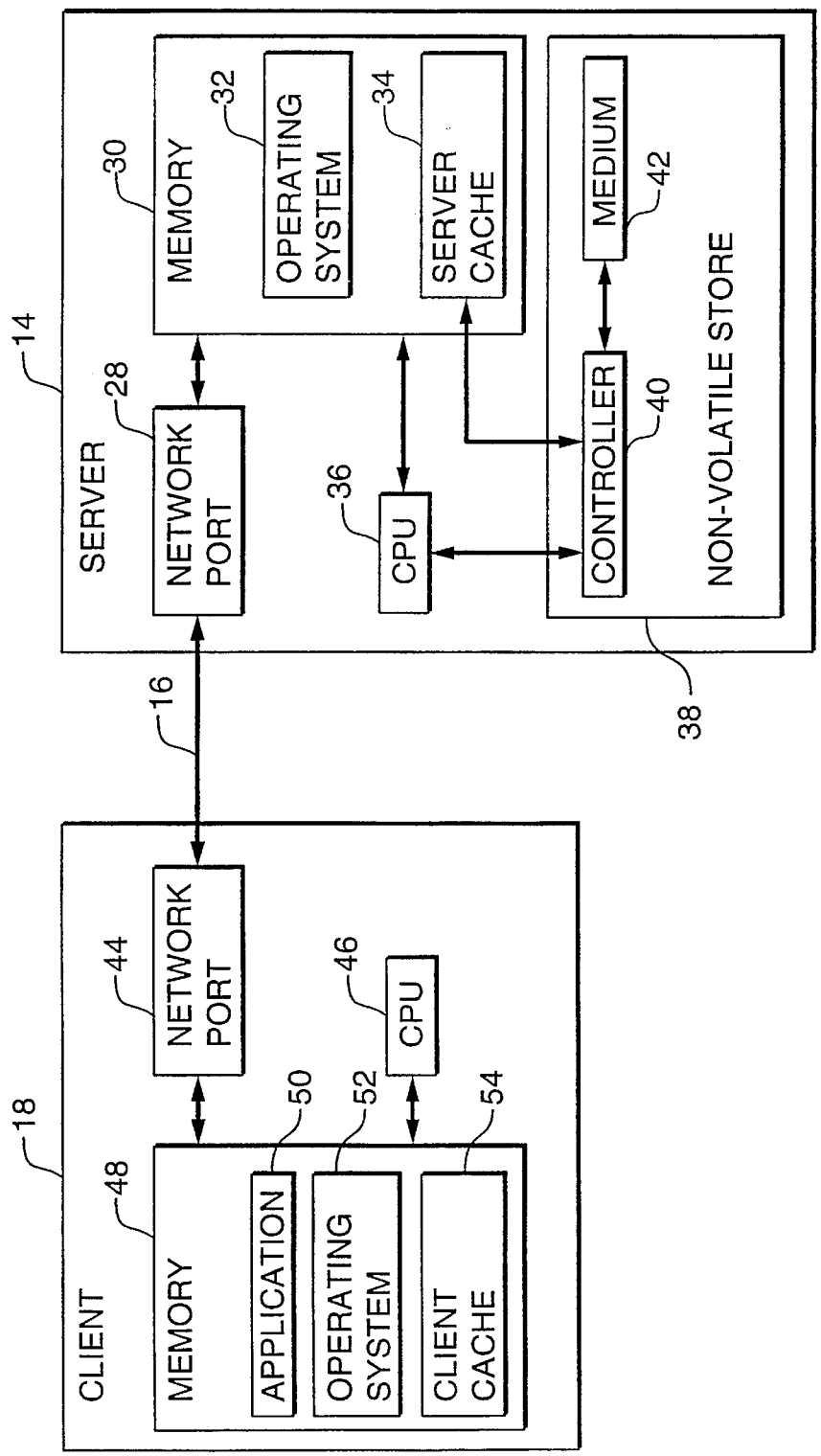
FIG. 2 is a diagram illustrating embodiments of a client computer and a server computer in the computer network according to the present invention.

One server 14 and one client 18 are further illustrated in FIG. 2. The server 14 includes a network port 28 which allows the server 14 to read packets from, and write packets to, the signal line 16 that carries packets between the server 14 and the client 18. The network port 28 includes hardware and software familiar to those in the art, and the packets are organized, transmitted, and interpreted in a manner that is readily determined by those of skill in the art.

The server 14 also includes a server memory 30. Typical embodiments of the server memory 30 include random access memory chips ("RAM") which form a volatile data store. As used herein, a data store is considered "volatile" if the temporary interruption of electrical power flowing normally to the device causes alteration or loss of data stored in the device. Thus, typical RAM is volatile, but battery-backed RAM is non-volatile. Other familiar non-volatile stores include, without limitation, magnetic hard disks, magnetic floppy disks, optical disks, CD-ROM disks, and magnetic tape.

It is well known that each such data store includes a substrate such as a magnetic material which is capable of storing data in physical form. According to the present invention, the substrate of the server memory 30 is given a specific physical configuration that causes the server 14 to operate in the manner taught herein. A first portion of the server memory 30 stores a server operating system 32. The server operating system 32 includes familiar operating system capabilities. However, these familiar capabilities are supplemented, modified, and/or replaced in a manner readily determined by those of skill in the art by the file recovery capabilities of the present invention.

A second portion of the server memory 30 stores a server cache 34. In the illustrated embodiment, the server cache 34 is logically outside the server operating system 32. In alternative embodiments the server cache 34 is part of the server operating system 32.

The server 14 also includes a central processing unit ("CPU") 36. The CPU 36 may be any familiar CPU, including without limitation commercially available complex instruction set and reduced instruction set microprocessors. The CPU 36 may also be implemented as a set of connected multiprocessors.

In addition, the server 14 includes a non-volatile store 38. The non-volatile store 38 is often physically located near the CPU 36 and the server memory 34, but in some embodiments the non-volatile store 38 is accessed over a signal line 16. Thus, three separate portions of the disk array 22 in FIG. 1 could be the non-volatile stores 38, respectively, of the three servers 14 shown. Alternatively, the entire disk array 22 could be the non-volatile store 38 of a single server 14. Those of skill in the art will readily determine ways in which to make the non-volatile store 38 accessible to the server 14.

The non-volatile store 38 includes a controller 40 of a type familiar to those of skill in the art, such as a disk controller. The controller 40 is in control signal communication with the CPU 36 and in data transfer communication with the server cache 34. Thus, the CPU 36 is capable of sending read and write requests to the controller 40. A read request requests the controller to read data from a non-volatile medium 42 (such as a magnetic disk medium) and to place a copy of that data at a specified location in the server cache 34. A write request requests the controller to write data to the non-volatile medium 42 and to then acknowledge to the CPU 36 that the write has been completed. The write request includes either a copy of the data to be written or, more commonly, the address of a memory location within the server cache 34 where the data to be written is presently located. The manner in which read and write requests are made and acknowledged is generally familiar to those of skill in the art, but the generation of such requests according to the present invention is novel.

With continued reference to FIG. 2, the client 18 includes a network port 44, a CPU 46, and a client memory 48. The network port 44 in the client 18 may be identical to the network port 28 in the server, or may simply be compatible to the extent needed to transfer packets between the signal line 16 and the client memory 48. The CPU 46 in the client 46 may be identical to the server CPU 36, but need not be.

Each of the CPUs 36, 46 must be capable of being controlled by software in a manner that makes the computers 14, 18 operate according to the present invention. One embodiment of suitable controlling software written in the C programming language is provided in a Listing Appendix attached hereto. However, those of skill will readily determine embodiments of software for controlling the CPUs 36, 46 in C++, assembly, or any other familiar programming language, or in a combination of such languages.

In one embodiment, the client memory 48 includes RAM which is configured in three portions to control operation of the client computer 18. A first portion of the client memory 48 stores an application program 50. Application programs 50 include, without limitation, word processors, spreadsheets, database managers, and program development tools.

A second portion of the client memory 48 stores a client operating system 52. The client operating system 52 includes familiar operating system capabilities compatible with the needs of the application programs 50 and the capabilities of the server operating system 32. However, these familiar capabilities are supplemented, modified, and/or replaced in a manner readily determined by those of skill in the art by the file recovery capabilities of the present invention.

A third portion of the client memory 48 stores a client cache 54. In the illustrated embodiment, the client cache 54 is logically outside the client operating system 52. In alternative embodiments the client cache 54 is part of the client operating system 52.

Figure 3:
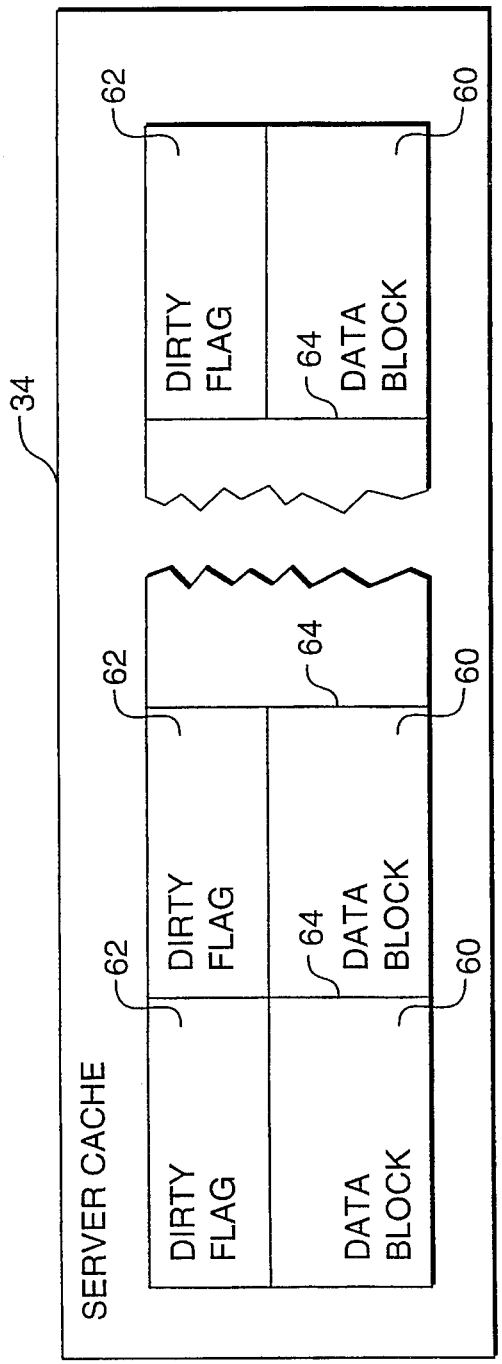
FIG. 3 further illustrates one embodiment of a server cache in the client computer.

With reference to FIGS. 2 and 3, one embodiment of the server cache 34 includes a plurality of server cache data blocks 60 and a corresponding plurality of dirty flags 62. Each server cache data block 60 is configured for temporary storage of a block of file data As used herein, "file data" includes, without limitation, file contents, directory information, name and address resolutions, and other data organized or used by an operating system or a file system. Thus, "file data" includes without limitation user-generated data and system structures maintained in familiar file systems such as the 12-bit and 16-bit File Allocation Table ("FAT") file systems first used by the MS-DOS® operating system (MS-DOS is a registered trademark of Microsoft Corporation), and analogous data maintained in the High Performance File System ("HPFS").

Those of skill in the art will readily determine both the appropriate size of each server cache data block 60 and the number of server cache data blocks 60 to locate within the server cache 34. Although the blocks 60 illustrated are in one large contiguous region of server memory 30, it will be appreciated that two or more separate regions of the memory 30 are used in other embodiments, with each separation between regions being aligned on a boundary 64 between two data blocks 60.

In some embodiments, the dirty flags 62 are all stored together as bits in an array of bits near one of the data blocks 60. In other embodiments, each dirty flag 62 is stored in a bit located physically near the data block 60 to which the flag 62 corresponds. In alternative embodiments, the dirty flags 62 are non-zero indexes or pointers in a list which holds the allocated data blocks; blocks which are still available are not referenced on the list. The list is typically arranged in LRU order, that is, with "least recently used" blocks near the front of the list. In some embodiments, each dirty flag 62 is represented as a pair of indexes which define a region of data, with the dirty flag 62 clean state occurring when the indexes define an empty region and the dirty state occurring when the indexes define a non-empty region.

Figure 4:
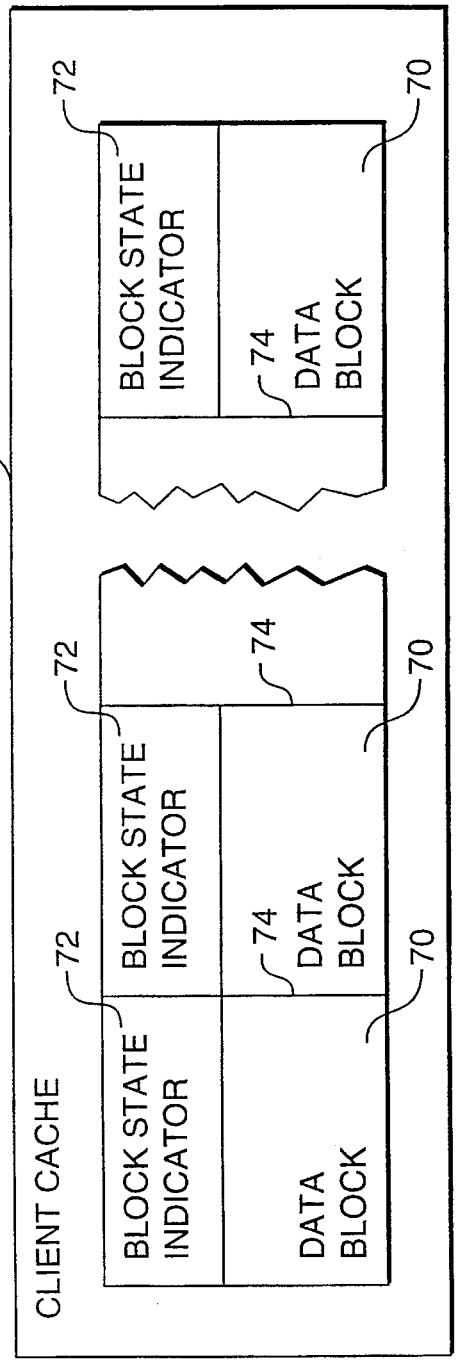
FIG. 4 further illustrates one embodiment of a client cache in the client computer.

With reference to FIGS. 2 and 4, one embodiment of the client cache 54 includes a plurality of client cache data blocks 70 and a corresponding plurality of client block state indicators 72. Each data block 70 is configured for temporary storage of a block of file data and for file data recovery according to the present invention. Those of skill in the art will readily determine both the appropriate size of each data block 70 and the number of data blocks 70 to locate within the client cache 54; neither the number of blocks nor the size of each block need equal the corresponding characteristics of the server cache 34. Although the blocks 70 illustrated are in one large contiguous region of client memory 48, it will be appreciated that two or more separate regions of the memory 48 are used in other embodiments, with each separation between regions being aligned on a boundary 74 between two data blocks 70.

In some embodiments, the block state indicators 72 are all stored together as two-bit bitfields in an array of bits near one of the data blocks 70. In other embodiments, each block state indicator 72 is stored in a bitfield physically near the data block 70 to which the indicator 72 corresponds. In alternative embodiments, the block state indicators 72 are non-zero indexes or pointers in two lists. One list holds client-cached block state indicators 72 corresponding to "dirty" data, while the other list holds server-cached block state indicators 72 corresponding to "grey" data. Blocks 70 which are available because they hold server-stored "clean" data are not referenced on either list.

In some embodiments, each block state indicator 72 is represented as two pair of indexes which define regions of data, with different block state indicator 72 states occurring according to whether the indexes define empty or non-empty regions. One pair of indexes defines a grey region, while the other pair of indexes defines a dirty region. When the grey region is non-empty, the block state indicator 72 is in the grey state. When the dirty region is non-empty but the grey region is empty, the block state indicator 72 is in the dirty state. When both regions are empty the block state indicator 72 is in the clean state. In the dirty, grey, and clean states, the block 70 contains valid read data. Prior to any read operations, the block 70 holds neither valid read nor valid write data and the block state indicator 72 is in an "unused" state.

Figure 5:
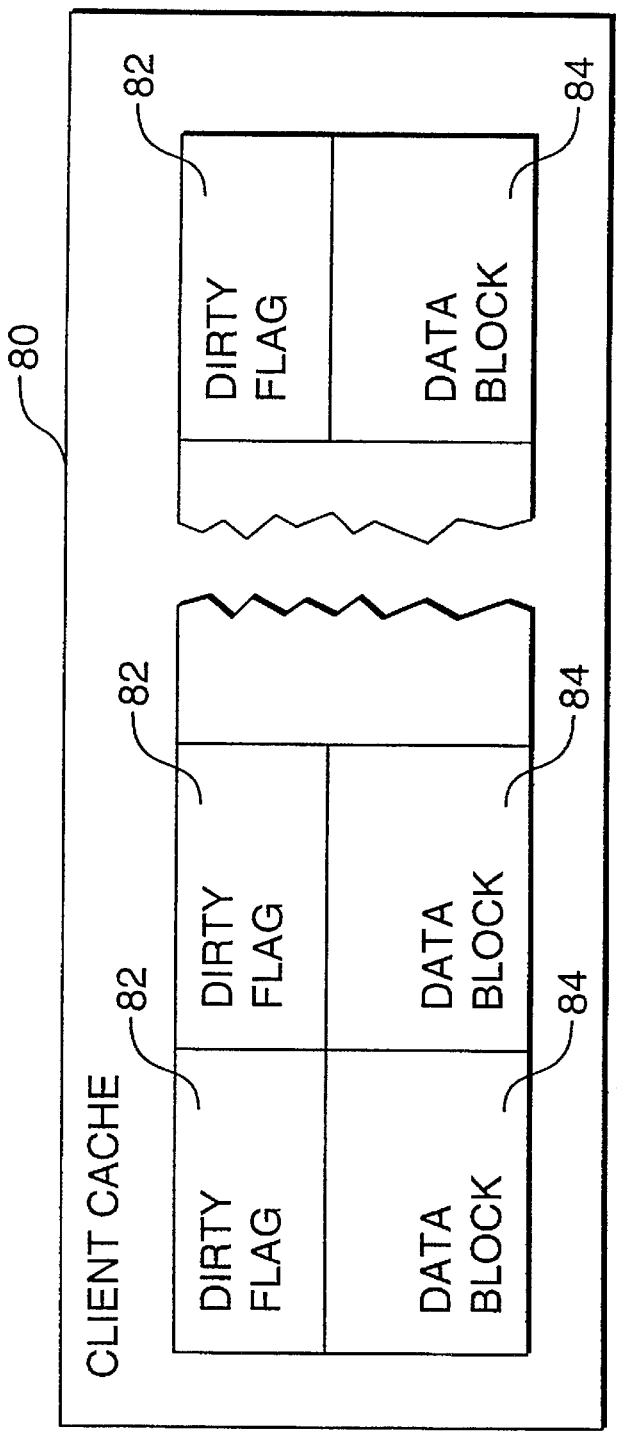
FIG. 5 illustrates a conventional client cache.

With reference to FIGS. 2, 4, and 5, a conventional client cache 80 contains dirty flags 82 instead of the block state indicators 72 of the present invention. Each dirty flag 82 is capable of switching between a "dirty" state and a "clean" state. When a particular dirty flag 82 is in the clean state, a corresponding data block 84 holds valid read data (data read from the server 14) and is available to receive file data for writing to the server 14.

When the dirty flag 82 is in the dirty state, the corresponding block 84 holds valid read data but is not available to hold data being written to the server 14 because the block 84 already contains file data that needs to be written. File data needs to be written if it is intended for storage on the file server but the file server has not yet acknowledged receiving the data. Prior to any read operations, the dirty flag 82 is in an "unused" state because the block 84 holds neither valid read nor valid write data.

By contrast, each block state indicator 72 of the present invention is capable of switching between three states when the corresponding client data block 70 is in use; a fourth state indicates the block 70 is not in use. The three use states are known as the "client-cached" or "dirty" state, the "server-cached" or "grey" state, and the "server-stored" or "clean" state. Prior to any read operations, each client data block 70 is in an "unused" state, indicating that the block 70 holds neither valid read nor valid write data.

The client-cached state of the present invention is analogous to the dirty state of the conventional approach. A particular block state indicator 72 enters the client-cached state after a corresponding data block 70 receives file data for transfer to the server 14 (FIG. 1), as a particular dirty flag 82 enters the dirty state when its corresponding data block 84 receives file data for transfer to a server.

However, neither the server-cached state nor the server-stored state of the present invention are analogous to the clean state of the conventional approach. Some similarity does exist. A particular block state indicator 72 enters the server-cached state when data stored in a corresponding data block 70 is known to have arrived at the server 14, just as a particular dirty flag 82 enters the clean state when data stored in a corresponding data block 84 is known to have arrived at the server.

But the similarity is limited. Under the conventional approach, arrival of the data at the server makes the client data block 84 available to be re-used, that is, to be overwritten by other file data. By contrast, according to the present invention the client data block 70 is freed for re-use only after the block state indicator 72 enters the server-stored state. This occurs after the data is actually stored in the non-volatile store 38. Thus, the conventional approach treats data as stored once the data reaches the server cache, whereas the present invention distinguishes between data written in the server cache 34 and data written on the non-volatile medium 42.

Accordingly, the terms "dirty" and "clean" carry different meanings, depending on whether they are used in connection with a cache variable such as the dirty flag 62 of the server cache 34 or with a cache variable such as the block state indicator 72 of the client cache 54. The term "grey" carries meaning only in connection with the block state indicator 72 of the present invention; dirty flags 62, 82 are never in a grey state.

Figure 6:
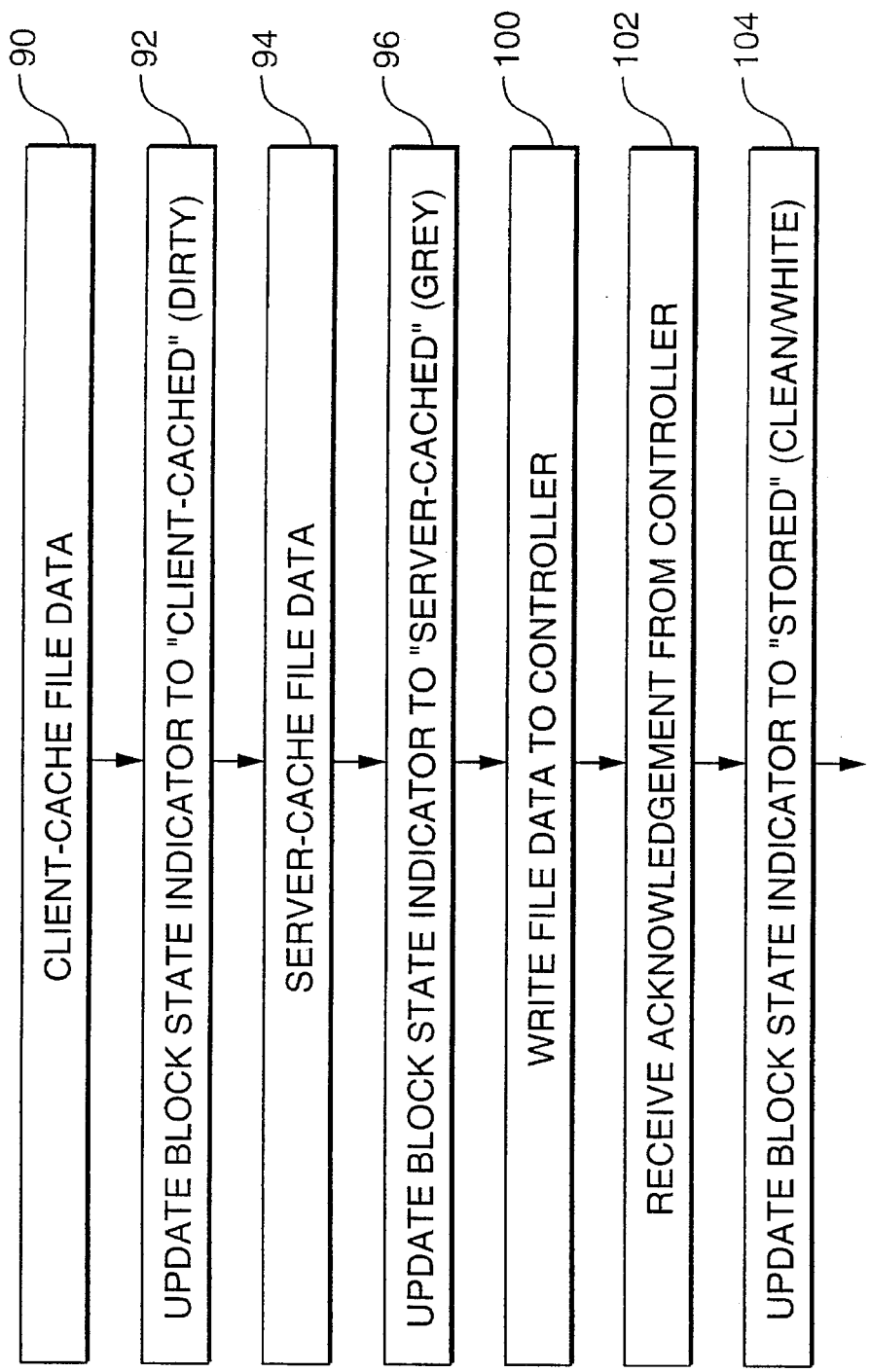
FIG. 6 is a flow chart illustrating a file data recovery method of the present invention.

The present invention also provides methods for assisting the recovery of files after a network fault occurs. With reference to FIGS. 2, 4, and 6, one method of the present invention includes a step 90 of client-caching a specified piece of file data. The file data is specified by the application 50 in a write request, or by the operating system 52 in response to such a write request, in a manner familiar in the art.

The step 90 includes locating a block 70 that is unused or clean, as indicated by the corresponding block state indicator 72. If no such block 70 is initially available, one may be obtained by flushing to the server store 38 data held in another block 70 which is grey or dirty, thereby making the flushed block 70 available. Once an unused or clean block 70 is located, it is reserved by setting a flag, by altering the contents of an available blocks list, or by similar means readily determined by those of skill in the art. The file data is then copied into the reserved data block 70 by memcpy() or an analogous function.

One embodiment of software for controlling the client memory 48 according to the present invention includes the C typedef CacheBlock and the functions CBLink(), CBUnlink(), CBFree(), CBGetFree(), and CBReleaseOwner() shown in the attached Listing Appendix. These functions assist in maintaining an LRU list of data blocks 70, that is, a list in which the least-recently used blocks 70 are flushed to the store 38 first when space for more file data is needed in the client cache 54.

During an indicating step 92 the method then indicates that client-caching is complete by updating the block state indicator 72 corresponding to the data block 70 that now holds the file data. After the indicating step 92, the block state indicator 72 is in the client-cached state, also known herein as the "dirty" state.

As is usual in the computer programming art, the term "writing" is used herein to include without limitation both memory copying and memory moving steps. Memory copying copies data from one or more locations in RAM to other locations in RAM so that two copies of the copied data result, while memory moving data copies from one or more locations in RAM to at least one different location in RAM and frees at least some of the first locations so that only one reliable copy of the data results. "Writing" also includes copying and/or moving data between RAM and non-volatile media. "Updating" or "changing" a specified location in RAM or on non-volatile media includes writing over the location such that the data previously stored at the location is potentially altered. Those of skill in the art will readily determine appropriate implementations for particular writing or updating steps according to the present invention.

With reference to FIGS. 2, 3, 4, and 6, the method also includes a step 94 of server-caching the file data. The file data is server-cached by transmitting it over the signal line 16 to the server 14 and then writing the file data to an available server cache data block 60. A server cache data block 60 is available if its corresponding dirty flag 62 is in the clean state. All dirty flags 62 are placed in the clean state when the server computer 14 boots itself.

During another indicating step 96, the method then indicates that server-caching is complete by updating the block state indicator 72 corresponding to the data block 70 that held the file data that now resides in the server cache data block 60. After the indicating step 92, the block state indicator 72 is in the server-cached state, also known herein as the "grey" state. The dirty flag 62 corresponding to the server cache data block 60 holding the file data is set, thereby marking the block 60 as dirty to prevent the data from being inadvertently overwritten.

During a writing step 100, the server CPU 36 requests storage of the file data on the non-volatile store 38 by writing the file data to the controller 40. In some embodiments, the CPU 36 sends the controller 40 a copy of the file data. More often, however, the CPU 36 sends the controller 40 the address of the file data in the server memory 30 and the controller 40 reads the data from that location when the controller 40 is ready. In either case, under normal circumstances the file data is eventually written on the non-volatile medium 42.

During a receiving step 102, the server CPU 36 then receives an acknowledgement from the controller 40 indicating that the file data has been stored on the medium 42. In response, the server CPU 36 sends an acknowledgement across the signal line 16 to the client 18. The client 18 then performs another indicating step 104, after which the block state indicator 72 corresponding to the stored data is in the server-stored or "clean" state. The server 14 clears the corresponding dirty flag 62, thereby placing it in its clean state.

One embodiment of software for appropriately updating the block state indicators 72 according to the present invention includes the typedefs CacheBlock and FileInfoBlock, as well as the functions CBCleanDirt(), CBCleanGrey(), CBMakeDirty(), CBMakeGreyDirty(), FIBDirtyGreyCBs(), and FIBWhitenGreyCBs() shown in the attached Listing Appendix. The terms "whiten" and "clean" are used interchangeably.

In embodiments that have background flush processes or threads running, access to FileInfoBlock variables is controlled by the functions FIBCheckIn(), FIBCheckOut(), FIBBusyCheck() using semaphores or other familiar exclusion means. Exclusive access is gained by a successful call to FIBCheckOut(), which sleeps the caller until the FIB is available. FIBBusyCheck() is used to determine if the variable desired is available without sleeping the caller. Access is released by calling FIBCheckIn().

The steps 90 through 104 may be interrupted at any point by a network fault. The present invention provides several methods for recovering files after the network fault, each of which takes advantage of accomplished steps in the interrupted set of steps 90 through 104. Thus, with reference to FIGS. 2, 6, and 7, one method of the present invention includes a reconnecting step 112. During the reconnecting step 112, a network connection between the client 18 and the server 14 is re-established in a manner readily determined by those of skill in the art. One embodiment of software for reconnecting the client 18 and the server 14 according to the present invention includes the typedef QuickPath and the functions ReestablishConnection() and ReestablishDirsToConnection() shown in the attached Listing Appendix.

Figure 7:
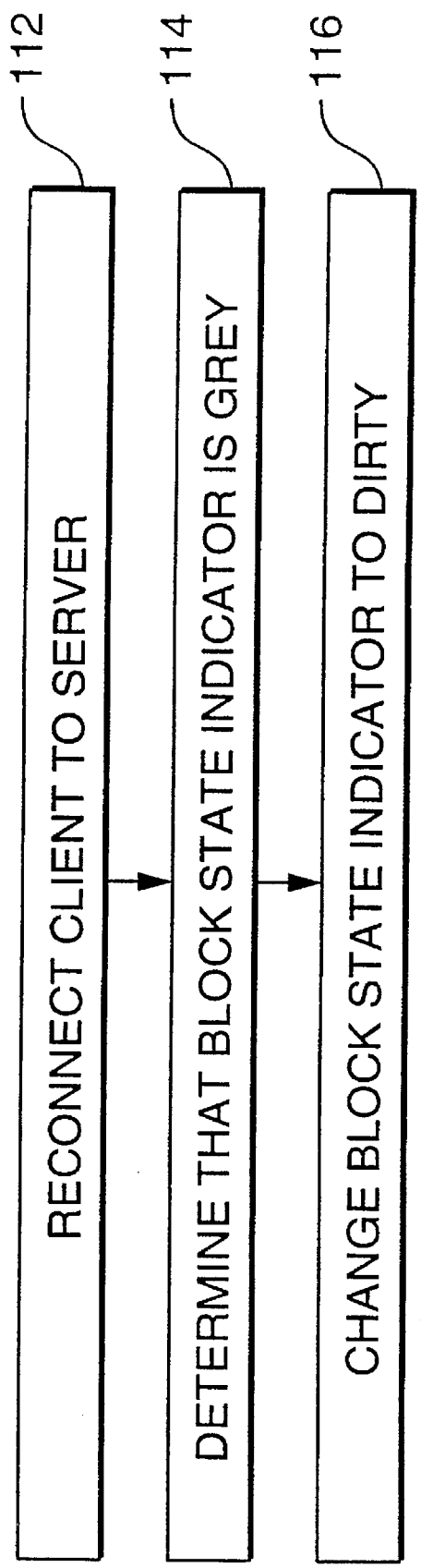
FIG. 7 is a flow chart illustrating another file data recovery method of the present invention.

With reference to FIGS. 4, 6, and 7, a determining step 114 then determines that some block state indicator 72 is in the grey state. That is, the network fault occurred after the server-cached indicating step 96 but prior to the server-stored indicating step 104. During a changing step 116, the block state indicator 72 is changed back into the client-cached dirty state to flush the data through to the server store 38.

In one variant, flushing is accomplished by performing steps 94 through 104 with respect to the data in the data block 70 corresponding to the changed block state indicator 72, regardless of whether any of those steps were performed before the network fault. Unlike conventional approaches, the present invention thus sends the only good copy of the data to the rebooted server 14 rather than overwriting and losing that data.

One embodiment of software for flushing data from the client 18 to the server store 38 according to the present invention includes the typedefs CacheBlock and FileInfoBlock, as well as the functions CBFlush() and FIBFlush() shown in the attached Listing Appendix. The embodiment illustrated also includes a function BackgroundWriteBehind(), which the operating system 52 runs during at least some of the time the application 50 is blocked, suspended, or preempted, in order to flush client cache 54 data to the server store 38.

Figure 8:
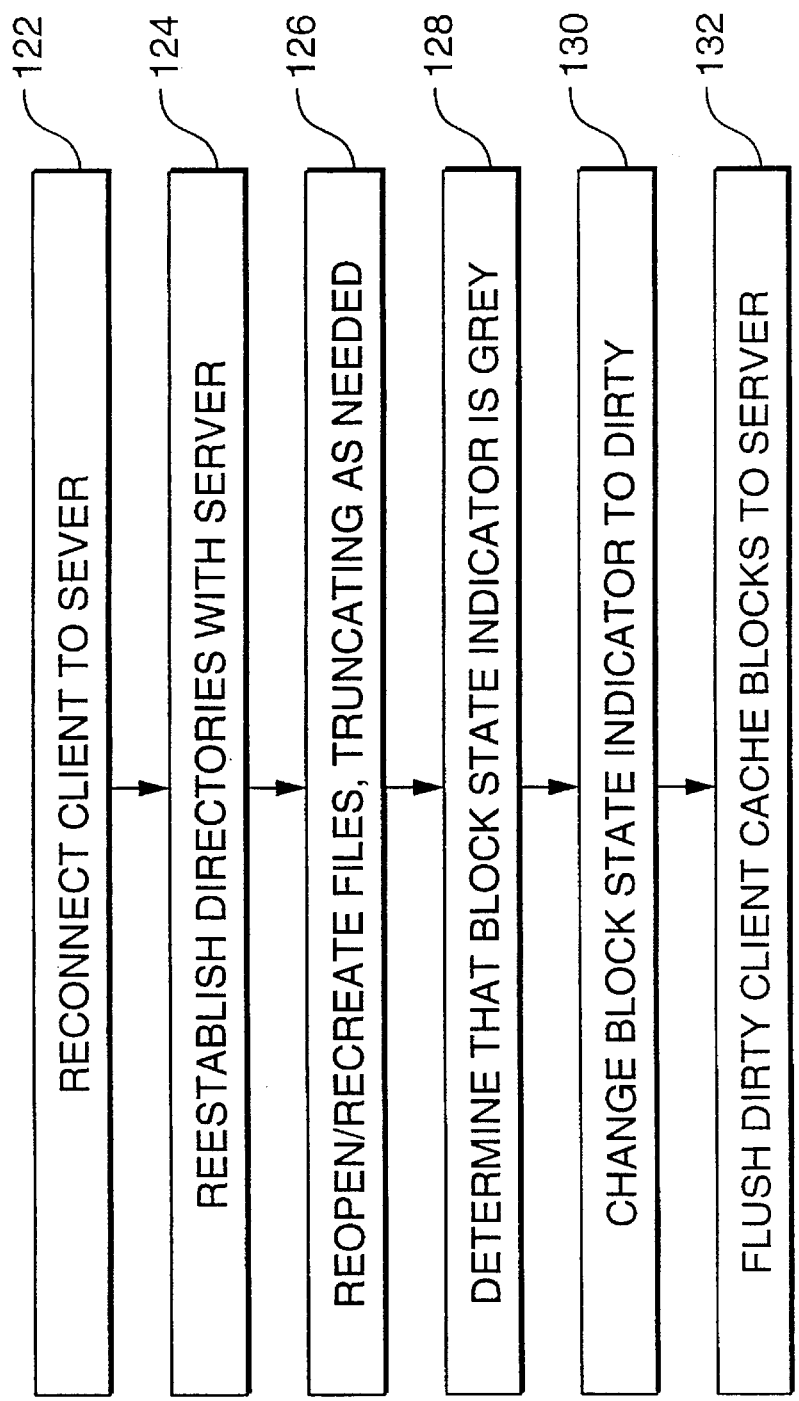
FIG. 8 is a flow chart illustrating another file data recovery method of the present invention.

FIG. 8 illustrates a variant of the method shown in FIG. 7. A reconnecting step 122 reconnects the client 18 and server 14 as previously discussed. A re-establishing step 124 assures that the client 18 and the server 14 agree on which directories the client 18 is accessing. One embodiment of the step 124 includes the function ReestablishDirsToConnection() shown in the attached Listing Appendix.

With reference to FIGS. 2 and 8, a reopening step 126 reopens earlier instances of files, or creates new instances, as appropriate. One embodiment of the step 124 includes the function ReOpenCreateFile() shown in the attached Listing Appendix. In general, new instances are created whenever a first user wishes to save client-cached data but the file toward which the data was traveling when the network fault occurred was modified by a second user between the time the server 14 rebooted after the fault and the time the first user attempted to save the data once again on the server store 38.

One embodiment of the step 124 utilizes a CREATE_VERIFY flag. During normal operation of the network 10, file creation operations may be requested of the server 14. The present invention detects such requests and sets the CREATE_VERIFY flag for the specified file (e.g., in the FileInfoBlock) in the client memory 48. If a network fault follows the transmission of this creation request and precedes the arrival of an acknowledgement by the server 14 that the creation has been effected on the server store 38, and if a request to open the file after the client 18 reconnects to the server 14 fails because the file was not found, then the creation request will be retransmitted to the server 14. The risk is low that the file was intentionally deleted after the network fault but before the open request. The CREATE_VERIFY flag is cleared only after the server 14 acknowledges that the file has been created on the store 38. One embodiment of the step 124 includes the function ReOpenCreateFile() shown in the attached Listing Appendix.

New file instances are truncated during the step 124 if a TRUNCATE_VERIFY flag is set. During normal operation of the network 10, truncation operations which appear very similar to write operations may be requested of the server 14. For instance, a truncation operation may request a write of zero bytes at a given offset in a specified file. The present invention detects such requests and sets the TRUNCATE_VERIFY flag for the specified file (e.g., in the FileInfoBlock) in the client memory 48. If a network fault follows the transmission of this truncation request and precedes the arrival of an acknowledgement by the server 14 that the truncation has been effected on the file on the server store 38, then the write request for zero bytes at the given offset will be retransmitted to the server 14. The TRUNCATE_VERIFY flag is cleared only after the server 14 acknowledges that the file on the store 38 has been truncated. One embodiment of the truncation portion of step 124 includes the functions TruncateFile() and ReOpenCreateFile() shown in the attached Listing Appendix.

With reference to FIGS. 2, 4, and 8, a determining step 128 and a changing step 130 determine which block state indicators 72 are in the server-cached state and reset those indicators to the client-cached state, respectively. A flushing step 132 then sends the corresponding data from the client data blocks 70 to the server 14 once again, thereby ensuring that the data will not be lost as a result of the network fault.

Figure 9:
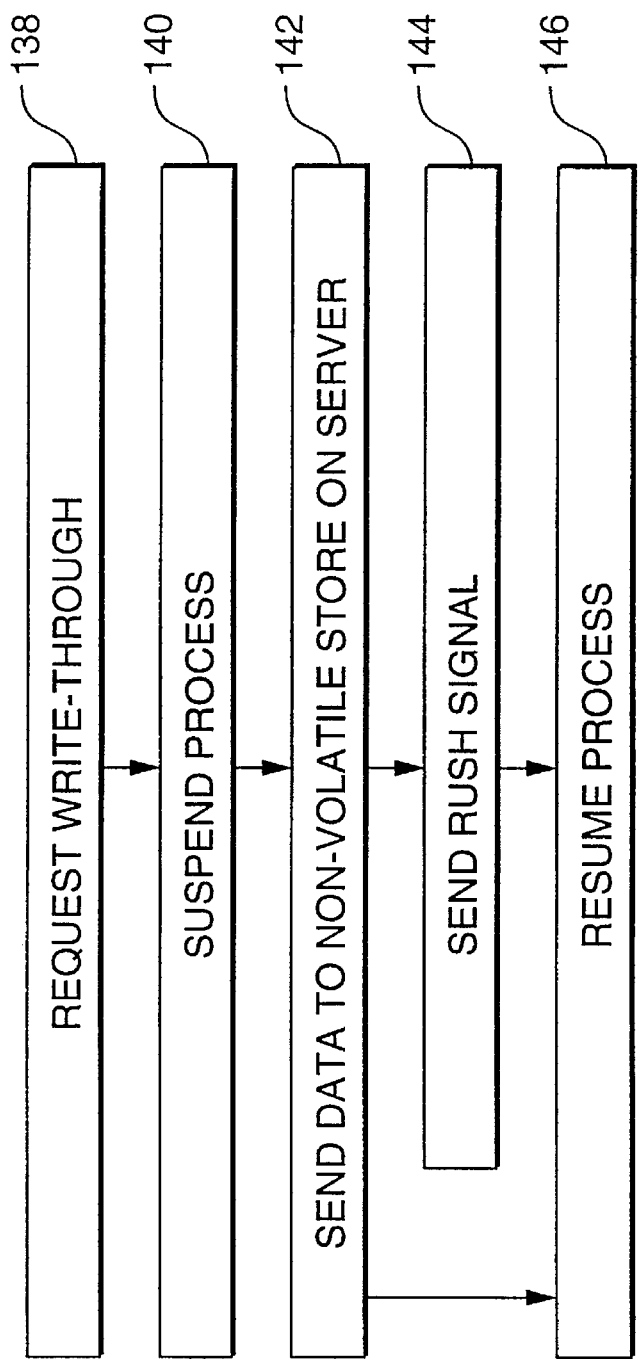
FIG. 9 is a flow chart illustrating a write-through method of the present invention.

An alternative method illustrated in FIGS. 2 and 9 allows use of the present invention in a "write-through" mode. At the high level of abstraction used by a typical application 50, the present invention's write-through mode appears similar to a conventional write-through. However, the present invention provides fault-recovery capabilities not found in conventional approaches.

Initially, the application 50 requests that specified file data be written-through to the server 14 during a requesting step 138. A suspending step 140 then suspends or "sleeps" the application 50. As a result, the application 50 stops and waits until it receives an acknowledgment that the data has been stored on the server store 38.

A sending step 142 sends the data from the client 18 to the server 14. The sending step 142 includes the steps 90 through 104 shown in FIG. 6. In some variants, the sending step 142 is followed by a signalling step 144 during which a "rush" signal corresponding to the file data is sent from the client 18 to the server 14. The rush signal reduces or eliminates the time during which the data is kept in the server cache 34 before being transferred to the controller 40. In one variant, the step 144 is used when a clean client cache data block 70 is needed but all client cache data blocks 70 are presently grey or dirty.

After the data is stored on the non-volatile medium 42, a resuming step 146 resumes execution of the application 50. The suspending step 140 and the resuming step 146 are accomplished by means familiar in the art. One embodiment of the write-through method of the present invention includes the global variable TrueCommit, which is set by users through an environment variable or similar means, as well as the function FILECommit() shown in the attached Listing Appendix.

Figure 10:
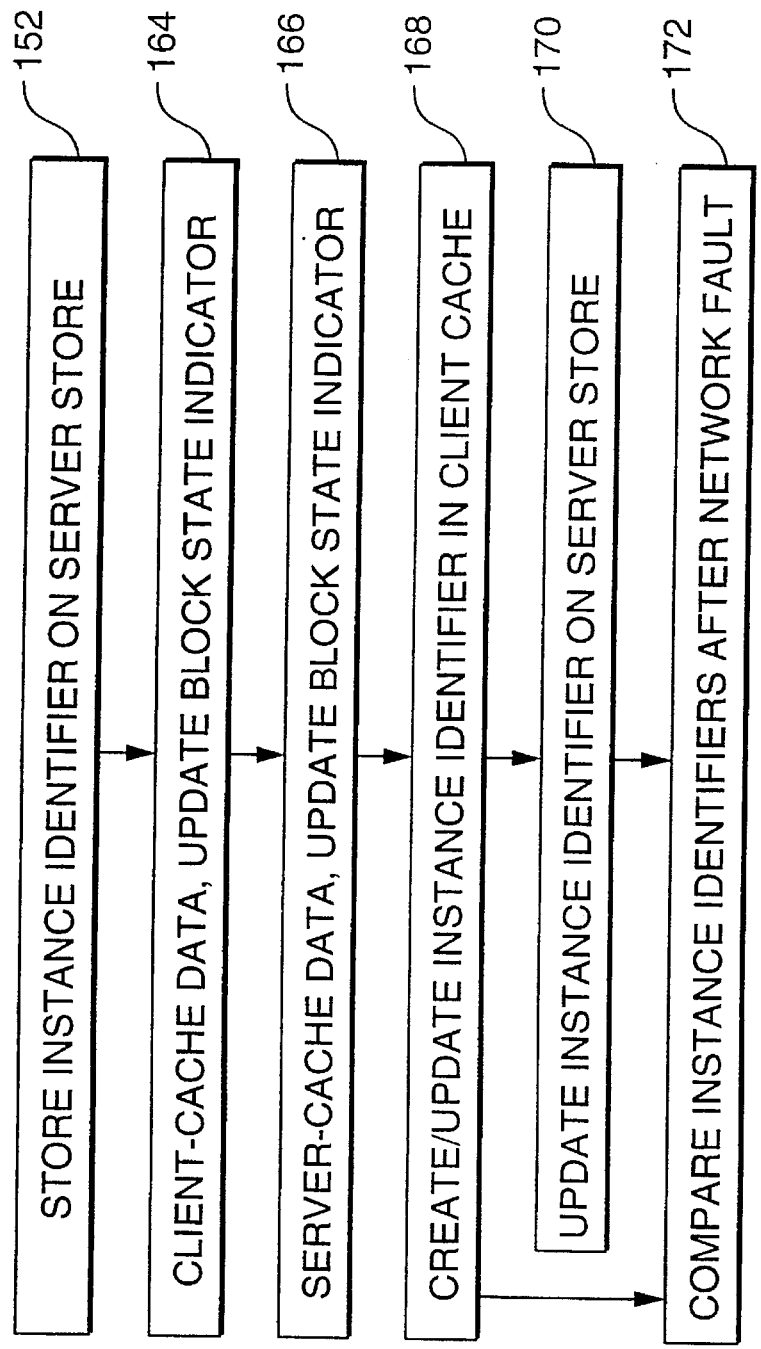
FIG. 10 is a flow chart illustrating an instance-creating method of the present invention.
Figure 11:
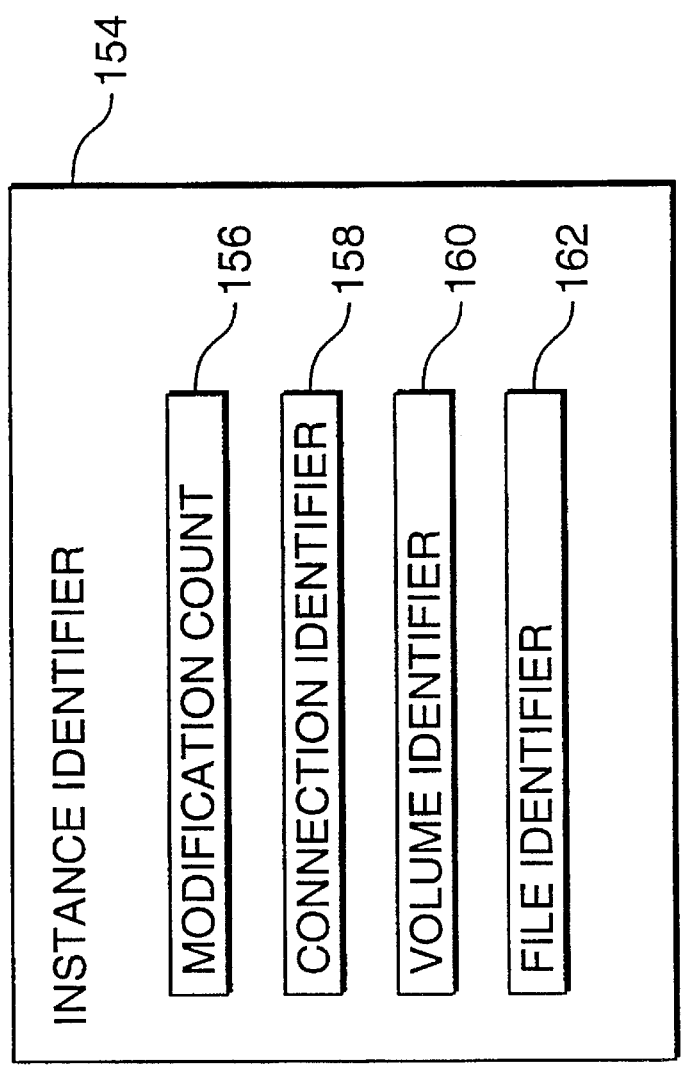
FIG. 11 is a diagram illustrating the components of an instance identifier according to the present invention.

FIGS. 2, 10, and 11 illustrate a variant of the present method which assists in recovering file data for one user when a file is modified by another user after a network fault occurs. A storing step 152 stores an instance identifier 154 of a predetermined file on the medium 42 in the server store 38. The illustrated embodiment of the instance identifier 154 includes a modification count 156 such as an integer or a long integer.

A connection identifier 158, a volume identifier 160, and a file identifier 162 are also part of the instance identifier 154. Suitable connection identifiers 158 include conventional identifiers supplied when the connection between the server 14 and the client 18 is made. Suitable volume identifiers 160 include conventional volume names. Suitable file identifiers 162 include conventional file names and file names concatenated with directory names. One embodiment of a file identifier includes the FileInfoBlock type illustrated in the Listing Appendix.

A client-caching step 164 corresponds to the client-caching step 90 and the indicating step 92 shown in FIG. 6. Likewise, a server-caching step 166 corresponds to the server-caching step 94 and the indicating step 96 of FIG. 6.

The first time it is performed, a creating/updating step 168 creates a copy of the instance identifier 154 in the client cache 54 by writing the values of the component parts 156 through 162 of the instance identifier 154 into the client memory 18. Subsequent performances of the step 168 update that copy of the instance identifier 154 each time a piece of file data is server-cached. Suitable updates include incrementing the modification count 156 by one; other increments or decrements are readily determined by those of skill in the art according to the present invention. Some variants of the present method store the instance identifier 154 within the client cache 54, while other variants store the instance identifier 154 in another part of the client memory 18. One suitable initial value for the modification count 156 is zero; other suitable values are readily determined.

An optional updating step 170 updates the copy of the instance identifier 154 on the server store 38 in connection with each update to the copy in client memory 48 during the creating-updating step 168. Variants of the present method reverse the relative order of the steps 168 and 170.

A comparing step 172 compares the copy of the instance identifier 154 located in the client memory 48 with the copy of the instance identifier 154 located on the server store 38 after a network fault. If the comparing step 172 determines that the two copies of the instance identifier 154 correspond to one another in a manner that indicates the file was not modified after the fault occurred, then it is safe to flush file data from the client cache 54 into the same instance of the file on the store 38.

One suitable comparing step 172 determines that the copies correspond if they contain the same value in each of the corresponding instance identifier components 156 through 162. However, the term "correspond" is used herein to indicate that strict equality is not required. For instance, one of skill could readily produce a variant in which corresponding copies differ by exactly N in their respective modification counts 156, where N is a predetermined positive integer.

If the comparing step 172 determines that the copies of the instance identifier 154 do not correspond, the user is notified that the file was modified by another user after the network fault and before all changes could be propagated from the client 18 to the server store 38. One suitable comparing step 172 determines that the copies do not correspond if their respective modification counts 156 differ.

In one variant, the user is given the option of saving the file data presently cached in the client cache 54 in a new instance of the file. In another variant, the invention automatically creates new instances using file names derived from the old instances. If no new file instance is authorized, the data is lost. But if the user wishes to create a new instance, or if the invention is configured to automatically create a new instance, that instance is created substantially as discussed in connection with the recreating and truncating step 126 shown in FIG. 8.

Regardless of whether the data is flushed to the original instance of the file or to a new instance, several variants are available. One variant flushes the data by performing at least the server-caching step 94, updating step 96, writing step 100, and receiving step 102 of FIG. 6, regardless of whether any of these steps were also performed before the network fault occurred. Another variant performs a conventional write-through on the data, while a third variant performs a write-through according to the present invention as illustrated and discussed in connection with FIG. 9.

Figure 12:
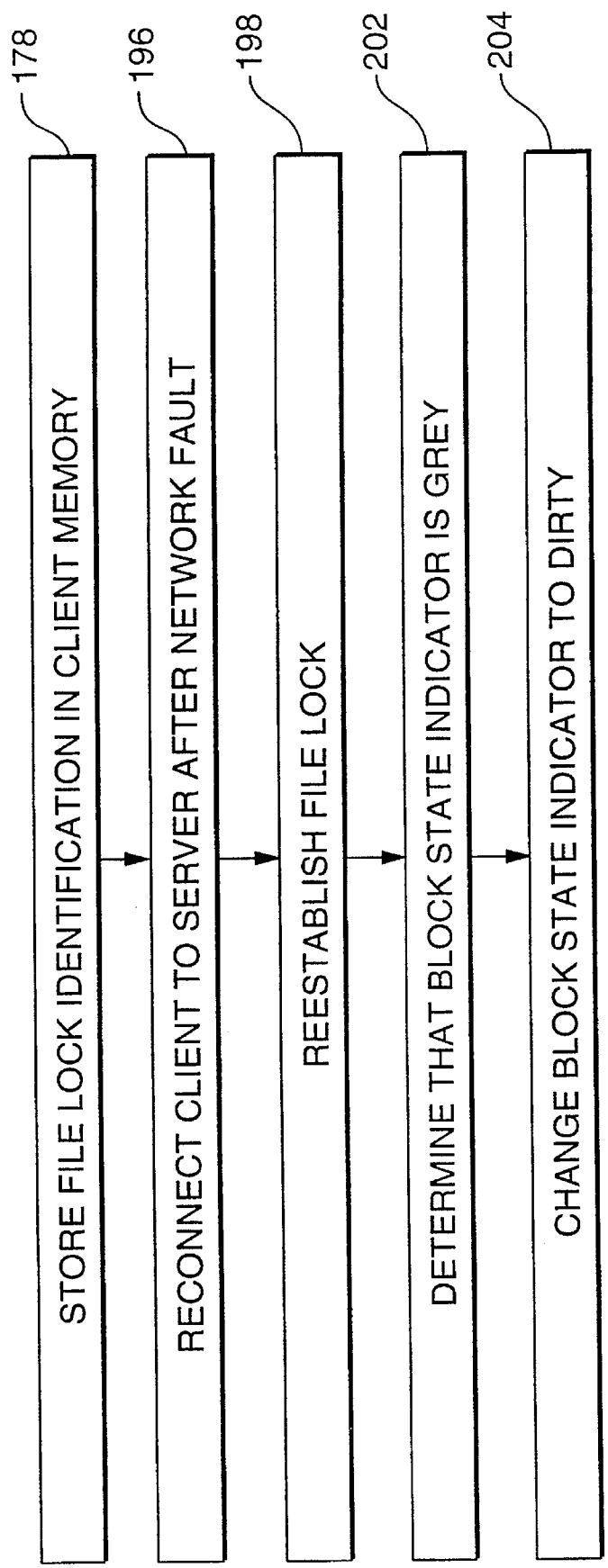
FIG. 12 is a flow chart illustrating a file lock recovery method of the present invention.
Figure 13:
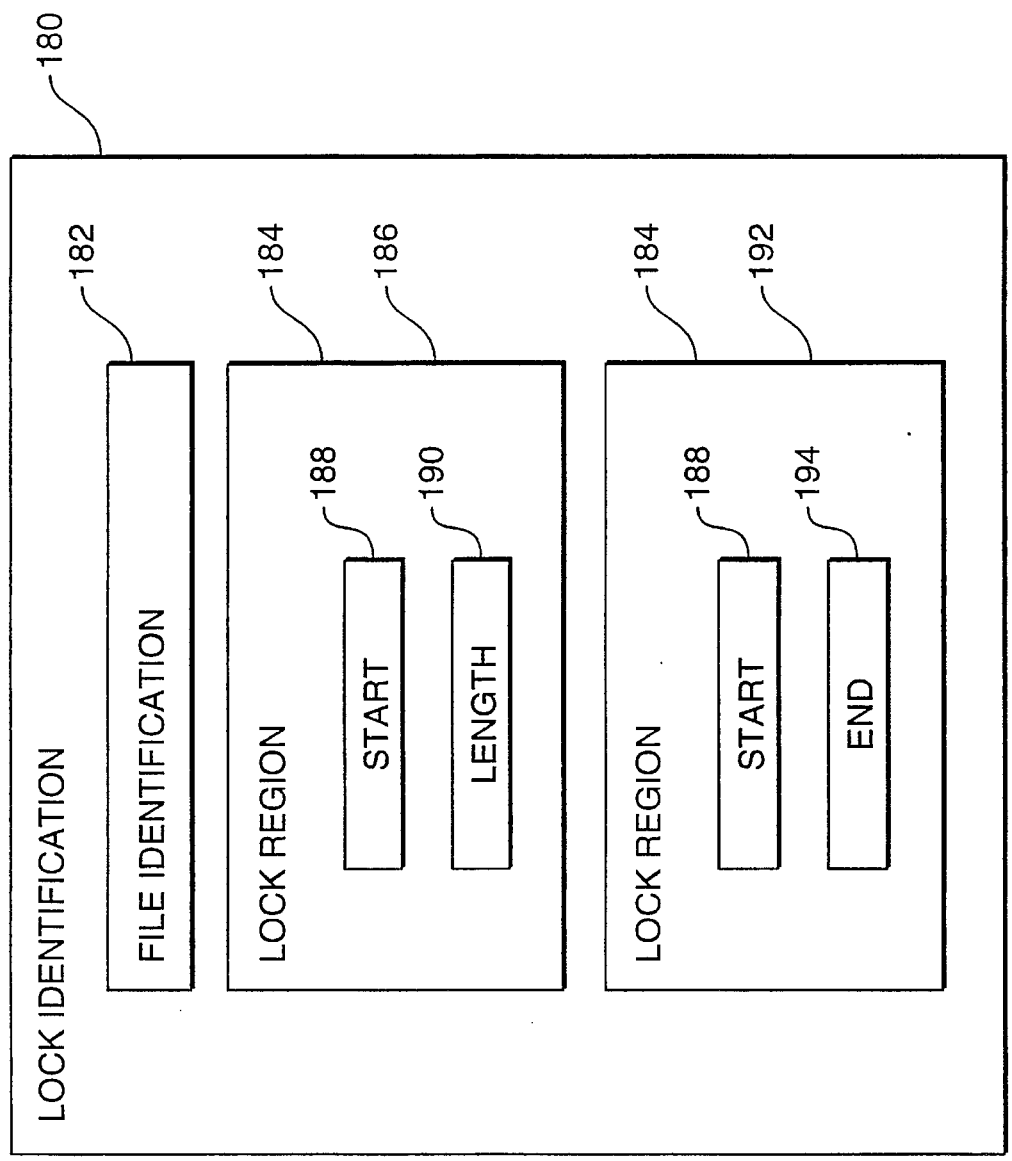
FIG. 13 is a diagram illustrating the components of a file lock identification according to the present invention.

With reference to FIGS. 2, 12, and 13, the present invention assists not only in the recovery of file data but also in the recovery of file locks. According to one method of the present invention, a storing step 178 stores a lock identification 180 of a file in the client memory 48. Suitable lock identifications 180 include a file identification 182 and a list of one or more lock regions 184. Suitable file identifications 182 include the components 158 through 162 shown in FIG. 11.

One suitable lock region 186 is specified by the starting offset 188 in the file of the beginning of the lock region 186 in combination with the length 190 of the lock region 186. Another suitable lock region 192 is specified by the starting offset 188 and by the ending offset 194. Other suitable lock regions 184 are readily determined by those of skill in the art.

As an optimization, one embodiment of the present invention uses "lock leases," which are quasi-locks maintained internally within either or both of the caches 34 and 54. A lock lease is applied to a file which is flagged as sharable but which is currently not being shared. A lock lease is released if a second process or user begins using the file. A lock lease is also released under circumstances when a file lock would be released, such as when the file is closed. Caching files which are flagged as sharable and are thus nominally not cachable is termed "opportunistic caching."

A reconnecting step 196 reconnects the client 18 to the server 14 after a network fault occurs. Suitable reconnection methods and systems are readily determined by those of skill in the art.

A re-establishing step 198 then re-establishes the lock(s) identified by the lock identification 180 by resubmitting the lock to the server 14 in a manner readily determined by those of skill in the art. Lock leases are handled internally by the client cache 54 and/or the server cache 34, and are not submitted as locks to the server operating system 32. A determining step 202 then determines that the block state indicator 72 (FIG. 4) corresponding to the file data is grey, namely, that the file data has been server-cached but not server-stored. A changing step 204 then changes the grey block state indicator 72 to dirty so that the file data will be flushed through to the server store 38.

Figure 14:
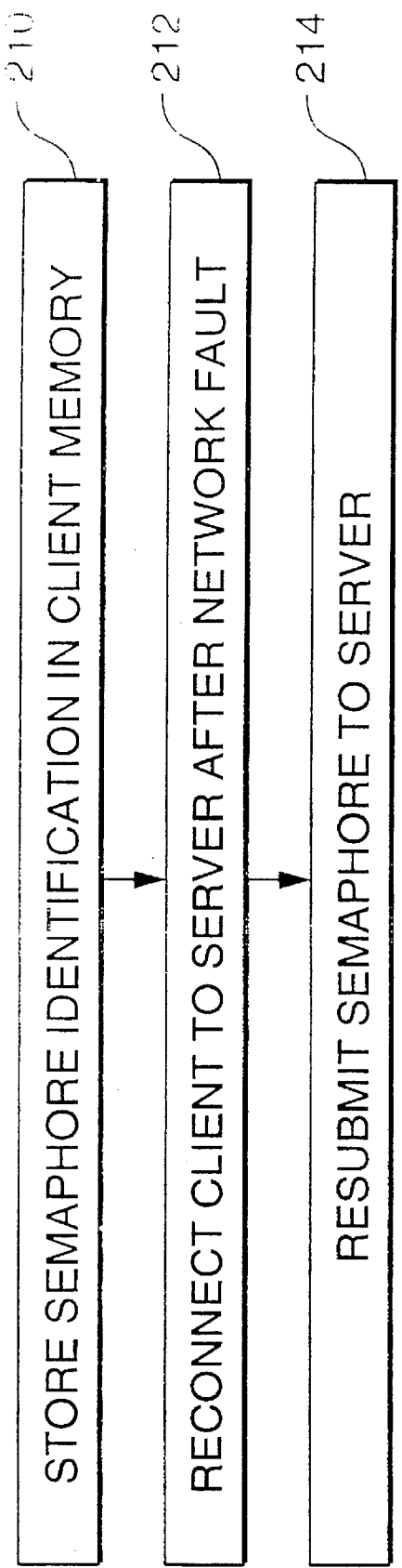
FIG. 14 is a flow chart illustrating a semaphore recovery method of the present invention.

With reference to FIGS. 2 and 14, the present invention assists not only in the recovery of file data but also in the recovery of semaphores. According to one method of the present invention, a storing step 210 stores a semaphore identification 180 in the client memory 48. Suitable semaphore identifications 180 include conventional semaphores controlling use of one or more files, printers, devices, ports, programs, objects, or other network resources. A reconnecting step 212 reconnects the client 18 to the server 14 after a network fault occurs. Suitable reconnection methods and systems are readily determined by those of skill in the art. A resubmitting step 214 then resubmits to the server 14 the semaphore(s) identified by the semaphore identification, thereby attempting to reclaim the resource(s) identified in the semaphore identification for exclusive use by the application 50.

Those of skill will appreciate that preferred embodiments of the present invention report errors and other conditions which interfere with the invention as it assists users in recovering files. One embodiment of the invention uses the function CantRedoFile(), shown in the attached Listing Appendix, to report predetermined errors. Other suitable error reporting and recovery means are readily determined by those of skill.

With reference to all Figures, articles of manufacture within the scope of the present invention include a computer-readable storage medium in combination with the specific physical configuration of a substrate of the computer-readable storage medium. The substrate configuration represents data and instructions which cause the computers 14 and 18 to operate in a specific and predefined manner as described herein. Suitable storage devices include floppy disks, hard disks, tape, CD-ROMs, RAM, and other media 11 (FIG. 1) readable by one or more of the file servers 14 and client computers 18. Each such medium tangibly embodies a program, functions, and/or instructions that are executable by the machines 14 and/or 18 to perform file data, file lock, and/or semaphore recovery steps of the present invention substantially as described herein.

Although particular apparatus and article embodiments of the present invention are expressly illustrated and described herein, it will be appreciated that additional and alternative apparatus and article embodiments may be formed according to methods of the present invention. Similarly, although particular method steps of the present invention are expressly described, those of skill in the art may readily determine additional and alternative steps in accordance with the apparatus and articles of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

PATENT APPLICATION
DOCKET NO. 1909.2.14

LISTING APPENDIX

~~TO~~

~~UNITED STATES PATENT APPLICATION~~

~~OF~~

~~IAN J. STILES~~

~~FOR~~

~~METHOD AND APPARATUS FOR~~

~~NETWORK FILE RECOVERY~~

Copyright 1995 Novell, Inc. All Rights Reserved.

```
//!----------------------------------------------------------------
//      Private API:
//
        BOOL                            //      <-      Returns result
BackgroundWriteBehind (                 //      Write-behind
        UINT32 startedFrom              //      ->      BACKGROUND_INDICATOR or
                                        //              FOREGROUND_INDICATOR (0)
        )
//
//      Return Values:
//              TRUE                            Something being written
//              FALSE                           Nothing to write
//
//      Async Service:
//              No
//
//      Comments:
//
//!----------------------------------------------------------------
{
        FileInfoBlock                   *fib;
        CacheBlock                      *pcb1, *pcb2;
        UINT32                          movingOffset1;
        BOOL                            result;

if (!AnyDirtyBlocks) {
                return (FALSE);
        } result = FALSE;

fib = (FileInfoBlock *) FibHead.ChunkHead;

while (fib) {
                if (fib->LinkType  == LINK_TYPE_USED
                &&      fib->DirtyBlocks
                &&      (fib->TotalOpenCount > 0
                ||      fib->Flags & FIBSTATUS_CLOSED_BEHIND_STAGE)
                &&      !(fib->Flags    &   (FIBSTATUS_TEMPORARY  |
FIBSTATUS_NOT_AUTHENTICATED))
                &&      !FIBBusyCheck (fib)) {

FIBCheckOut (fib);

movingOffset1 = 0xFFFFFFFF;

// Find the first dirty block to start our search with
                        pcb1 = fib->CacheHead;
                        while (pcb1) {
                                if (pcb1->DirtyEnd && pcb1->FileOffset < movingOffset1) {
                                        movingOffset1 = pcb1->FileOffset;
                                }
                                pcb1 = pcb1->FileCBNext;
                        } if (movingOffset1 == 0xFFFFFFFF) {
                                #if DEBLEVEL > 0
                                NiosPrintf     (FileDirHandle,     NiosSystemFlags    &
SF_DEBUGGER_PRESENT_BIT ?
                                        MT_DEBUG_OUT : MT_ALERT,
                                        "\r\nRecoverable Error: Dirty cache block underflow,
location 3.\
                                        \r\nFile %s may be corrupted.",
```

Copyright 1995 Novell, Inc.  All Rights Reserved.

```
                        fib->DOSFileName[0]  ==  0  ?  fib->LongName  :
fib->DOSFileName);

PrintActionTrace (fib, "Cache block underflow 3");

DebugBadThing (0xD12770FF);    // "DIRTY OFF"
                #endif fib->DirtyBlocks = 0;                    // Best effort to fix it
                StatDirtyCountUnderflow++;
            }

FIBFindTwoContiguous (fib, movingOffset1, &pcb1, &pcb2);

if (pcb1 && !pcb1->DirtyEnd) {
                pcb1 = 0;
            }
            if (pcb2 && !pcb2->DirtyEnd) {
                pcb2 = 0;
            } if (pcb1 && pcb2) {                    // Ensure both are contiguously dirty
                if (pcb1->DirtyEnd != CACHE_BLOCK_SIZE
                ||     pcb2->DirtyStart != 0) { pcb2 = 0;
                }
            } if (pcb1) {
                RecordAction (fib, RA_WRITE_BEHIND_START); // debug log CBUnlink (pcb1, CACHE_LINK_TYPE_SYSTEM);
                fib->UserStorage[0] = (UINT32) pcb1;

result = TRUE;

if (pcb2) {
                    CBUnlink (pcb2, CACHE_LINK_TYPE_SYSTEM);
                    fib->UserStorage[1] = (UINT32) pcb2;
                    // go thru indirection to desired protocol, e.g.,
                    // NCPWriteFile() (other possible protocols
                    // include Server Message Block (SMB))
                    SESSTable.SESSWriteFile (fib, (pcb1->FileOffset + pcb1->DirtyStart),
                            (pcb1->DirtyEnd - pcb1->DirtyStart),
                            (UINT8 *) (pcb1->Data + pcb1->DirtyStart),
                            (pcb2->DirtyEnd - pcb2->DirtyStart),
                            (UINT8 *) (pcb2->Data + pcb2->DirtyStart),
                            &fib->UserStorage[2],
                            startedFrom    |    APP_HANDLES_ERRORS,
FinishWrite);

} else {
                    fib->UserStorage[1] = 0;

SESSTable.SESSWriteFile (fib, (pcb1->FileOffset + pcb1->DirtyStart),
                            (pcb1->DirtyEnd - pcb1->DirtyStart),
                            (UINT8 *) (pcb1->Data + pcb1->DirtyStart),
                            0, 0, &fib->UserStorage[2],
```

Copyright 1995 Novell, Inc. All Rights Reserved.

```
                                startedFrom  |  APP_HANDLES_ERRORS,
FinishWrite);
                    }
                break;
            } else {
                FIBCheckIn (fib);
            }
        }
        fib = (FileInfoBlock *) fib->ChunkNext;
    }
    return (result);
}
```

Copyright 1995 Novell, Inc.   All Rights Reserved.

```
typedef struct    CacheBlockTag {
      struct CacheBlockTag   *SysNext;      // 00h The order of these three must
      struct CacheBlockTag   *LRUNext;      // 04h match the order of the head
      struct CacheBlockTag   *LRUBack;      // 08h pointers in the data segment
      struct CacheBlockTag   *FileCBNext;// 0Ch
      struct CacheBlockTag   *FileCBBack;// 10h
      FileInfoBlock          *FibOwner;     // 14h
      UINT32                 FileOffset;    // 18h
      UINT32                 ValidStart;    // 1Ch Relative to this buffer
      UINT32                 ValidEnd;      // 20h Points one past or 0 if none
      UINT32                 DirtyStart;    // 24h Relative to this buffer
      UINT32                 DirtyEnd;      // 28h Points one past or 0 if none
      UINT32                 GreyStart;     // 2Ch Relative to this buffer
      UINT32                 GreyEnd;       // 30h Points one past or 0 if none
      UINT32                 Checksum;      // 34h Accusation invalidator
      UINT8                  *Data;         // 38h
} CacheBlock;                               // 3Ch
```

Copyright 1995 Novell, Inc.  All Rights Reserved.

```
//!----------------------------------------------------------------
//     Private API:
//
       static
       VOID                              //     No output
CantRedoFile (                           //     Prints ALERT box naming file that
                                         //     failed reconnect
       FileInfoBlock *fib,               // -> FileInfoBlock entry for the file
       UINT32 reason                     //     -> Reason equate (see BECAUSE_... in
FILEDIR.H)
       )
//
//     Return Values:
//                  None
//
//     Async Service:
//                  No
//
//     Comments:
//
//!----------------------------------------------------------------
{
       RecordAction (fib, RA_CANT_RECONNECT_FILE);   // update debug log switch (reason) {
       case BECAUSE_LEVEL_TOO_LOW:
               NiosPrintf (FileDirHandle, MT_ALERT,
                       "\r\nFile %s could not be auto-reconnected because AUTO RECONNECT
LEVEL = %d which is too low.",
                       fib->DOSFileName[0] == 0 ? fib->LongName : fib->DOSFileName,
AutoReconnect);

break;

case BECAUSE_DELETED_WHILE_GONE:
               NiosPrintf (FileDirHandle, MT_ALERT,
                       "\r\nFile %s could not be auto-reconnected because it was deleted
while the network connection was interrupted.",
                       fib->DOSFileName[0] == 0 ? fib->LongName : fib->DOSFileName);

break;

case BECAUSE_NO_SERVER_SUPPORT:
               NiosPrintf (FileDirHandle, MT_ALERT,
                       "\r\nFile %s could not be auto-reconnected because this version
of the server does not support it.",
                       fib->DOSFileName[0] == 0 ? fib->LongName : fib->DOSFileName);

break;

case BECAUSE_CANT_RECREATE_IT:
               NiosPrintf (FileDirHandle, MT_ALERT,
                       "\r\nFile %s could not be auto-reconnected because the file could
not be re-created.",
                       fib->DOSFileName[0] == 0 ? fib->LongName : fib->DOSFileName);

break;

case BECAUSE_ACCESS_DENIED:
               NiosPrintf (FileDirHandle, MT_ALERT,
                       "\r\nFile %s could not be auto-reconnected because access was
denied.",
```

Copyright 1995 Novell, Inc.  All Rights Reserved.

```
                    fib->DOSFileName[0] == 0 ? fib->LongName : fib->DOSFileName);

break;

case BECAUSE_CANT_RELOCK_IT:
                NiosPrintf (FileDirHandle, MT_ALERT,
                    "\r\nFile %s could not be auto-reconnected because the file's
locks could not be reestablished.",
                    fib->DOSFileName[0] == 0 ? fib->LongName : fib->DOSFileName);

break;

case BECAUSE_OLD_UTILITY_RAW_FILE:
                NiosPrintf (FileDirHandle, MT_ALERT,
                    "\r\nFile %s could not be auto-reconnected because the utility
that opened the stream file is too old.",
                    fib->DOSFileName[0]    ==    0    ?    "UNKNOWN    STREAM    FILE"    :
fib->DOSFileName);

break;

case BECAUSE_LOW_ON_MEMORY:
                NiosPrintf (FileDirHandle, MT_ALERT,
                    "\r\nFile %s could not be auto-reconnected because of a low
memory condition.",
                    fib->DOSFileName[0] == 0 ? fib->LongName : fib->DOSFileName);

break;

default:
                NiosPrintf (FileDirHandle, MT_ALERT,
                    "\r\nFile %s could not be auto-reconnected because of an unknown
reason.",
                    fib->DOSFileName[0] == 0 ? fib->LongName : fib->DOSFileName);

break;
        } if (FIBBusyCheck (fib)) {
                // If its busy, flag it as reconnect failed so it can be cleaned up
when the FIB
                //    is checked back in...
                fib->Flags |= FIBSTATUS_RECONNECT_FAILED;

} else {
                // If its not busy, clean it up now
                FILEAbort (fib->PG_ID, fib->ProcessID[0], fib->AliasHandle);
        } return;
}
```

Copyright 1995 Novell, Inc.  All Rights Reserved.

```
//!-----------------------------------------------------------------
//      Private API:
//
//      VOID                        //    No return value
// CBCleanDirt (                    //    Decrements dirty counts,
//                                  //    resets dirty offsets
//          CacheBlock *pcb,        //    ->   Address of cache block
//          UINT32 flags            //    ->   Any combination of the following
//                                  //         VERIFY_DISK_UPDATE to ensure
//                                  //         file integrity
//      )
//
//      Return Values:
//              none
//
//      Async Service:
//              Yes
//
//      Comments:
//
//!-----------------------------------------------------------------
{
      if (pcb->DirtyEnd) {       // This could have been cleared by
                                 // background write behind
            if (flags & VERIFY_DISK_UPDATE) {
                  pcb->GreyStart      =     pcb->DirtyStart;
                  pcb->GreyEnd        =     pcb->DirtyEnd;
                  pcb->FibOwner->GreyBlocks++;
                  AnyGreyBlocks++;
            } pcb->FibOwner->DirtyBlocks--;
            AnyDirtyBlocks--;

pcb->DirtyStart     =     pcb->DirtyEnd = 0;
      } return;
}
```

Copyright 1995 Novell, Inc. All Rights Reserved.

```
//!————————————————————————————————————————————————
//      Private API:
//
        VOID                //      No return value
CBCleanGrey (               //      Decrements grey counts, resets grey offsets
        CacheBlock *pcb     //      ->      Address of cache block
        )
//
//      Return Values:
//                  none
//
//      Async Service:
//                  Yes
//
//      Comments:
//
//!————————————————————————————————————————————————
{
        if (pcb->GreyEnd) { // This could have been cleared by background call-back
            pcb->FibOwner->GreyBlocks--;
            AnyGreyBlocks--;
            pcb->GreyStart    =    pcb->GreyEnd = 0;
        } return;
}
```

Copyright 1995 Novell, Inc.  All Rights Reserved.

```
//!—————————————————————————————————————————————————————————————————
//      Private API:
//
        VOID                    //      No return value
CBFlush (                       //      Flushes buffer if dirty
        CacheBlock *pcb         //      -> Address of cache block to flush
                                //      AND has been unlinked from the SYSTEM LRU
        )
//
//      Return Values:
//              none
//
//      Async Service:
//              Yes
//
//      Comments:
//
//!—————————————————————————————————————————————————————————————————
{
        UINT32                          movedThisMuch;
        UINT32                          returnCode;

if (pcb->FibOwner) {
                if (pcb->DirtyEnd) {
                        returnCode = WriteOrCritError (pcb->FibOwner,
                                (pcb->FileOffset + pcb->DirtyStart),
                                (pcb->DirtyEnd - pcb->DirtyStart),
                                (UINT8 *) (pcb->DirtyStart + pcb->Data),
                                0, 0, &movedThisMuch, 0);

CBCleanDirt (pcb, VERIFY_DISK_UPDATE);
                }
        } return;
}
```

Copyright 1995 Novell, Inc.  All Rights Reserved.

```
//!————————————————————————————————————————————
//      Private API:
//
        VOID                    //      No return value
CBFree (                        //      Flushes buffer if dirty, links on to free LRU
        CacheBlock *pcb         //      ->      Address of cache block
        )
//
//      Return Values:
//                  none
//
//      Async Service:
//                  Yes
//
//      Comments:
//
//!————————————————————————————————————————————
{
        if (pcb) {
                if (pcb->FibOwner) {
                        CBReleaseOwner (pcb);

// Put at bottom of LRU
                        CBLink (pcb, CACHE_LINK_TYPE_SYSTEM, LINK_POSITION_BOTTOM);
                }
        }
        return;
}
```

Copyright 1995 Novell, Inc.  All Rights Reserved.

```
//!------------------------------------------------------------
//      Private API:
//
        CacheBlock *            //      <-      CacheBlock, or zero if none
CBGetFree (                     //      Finds an LRU cache block and unlinks it
        UINT32 priority,        //      ->      One of the following priority levels
                                //              PRIORITY_HIGH
                                //                      takes free, read, grey, or dirty
                                //              PRIORITY_MEDIUM
                                //                      takes free, read, or grey
                                //              PRIORITY_LOW
                                //                      takes free only
        UINT32 flags            //      ->      Any combination of the following
                                //              BACKGROUND_INDICATOR
                                //                      if calling from background
        )
//
//      Return Values:
//              none
//
//      Async Service:
//              Yes
//
//      Comments:
//              Note: The PRIORITY_HIGH can only be used from the foreground since
//                    we may have to flush writes to the network.  If it were
//                    called from the background while the connection was busy it
//                    would dead-lock since control wouldn't be returned to the
//                    foreground.
//
//!------------------------------------------------------------
{
        CacheBlock      *pcb;
        UINT32          returnCode;

pcb = CacheBlockLRUEnd;

if (pcb && pcb->DirtyEnd && !FIBBusyCheck (pcb->FibOwner)) {
                FIBCheckOut (pcb->FibOwner);

returnCode = FIBFlush (pcb->FibOwner, flags | APP_HANDLES_ERRORS);

if (!returnCode) {
                        // Ping server to hurry up a bit
                        SESSTable.SESSBoostWrites (pcb->FibOwner->ConnHandle,
                                flags | APP_HANDLES_ERRORS);
                }

FIBCheckIn (pcb->FibOwner);

pcb = CacheBlockLRUEnd;
        } if (pcb && pcb->ValidEnd) {
                if (pcb->DirtyEnd) {
                        if (priority < PRIORITY_HIGH) {
                                pcb = 0;
                        }
                } else {
                        if (priority < PRIORITY_MEDIUM
                        &&   !(pcb->FibOwner->Flags & FIBSTATUS_CLOSED_BEHIND_STAGE))
                                pcb = 0;
```

Copyright 1995 Novell, Inc. All Rights Reserved.
```
            }
        }
    } if (pcb) {   // cache block LRUed off some file's list, being given
                 // to another file
        CBReleaseOwner (pcb);
    } else {
        StatCacheBlockNotAvailable++;
    } return (pcb);
}
```

Copyright 1995 Novell, Inc. All Rights Reserved.

```
//!────────────────────────────────────────────────────────────────
//      Private API:
//
        VOID                    //      No return value
CBLink (                        //      Links cache block into system and/or file list
        CacheBlock *pcb,        //      ->      Address of cache block
        UINT32 flags,           //      ->      Specifies the link type to link into
                                //                      CACHE_LINK_TYPE_FILE
                                //                      CACHE_LINK_TYPE_SYSTEM
        UINT32 position         //      ->      Specifies location in linked list
                                //                      LINK_POSITION_BOTTOM (will be used next)
                                //                      LINK_POSITION_TOP    (will be used least)
        )
//
//      Return Values:
//              none
//
//      Async Service:
//              Yes
//
//      Comments:
//
//!────────────────────────────────────────────────────────────────
{
        FileInfoBlock           *fib;
        UINT32                  stateInfo;

if (pcb) {
                stateInfo = NiosPushfdCli ();
                fib = pcb->FibOwner;
                if (flags & CACHE_LINK_TYPE_SYSTEM) {
                        if (pcb->LRUNext || pcb->LRUBack) {
                                CBUnlink (pcb, CACHE_LINK_TYPE_SYSTEM);
                        } if (position == LINK_POSITION_BOTTOM) {
                                if (pcb == CacheBlockLRUEnd)
                                        CacheBlockLRUEnd = CacheBlockLRUEnd->LRUBack;
                                pcb->LRUNext            =       0;
                                pcb->LRUBack            =       CacheBlockLRUEnd;
                                if (CacheBlockLRUEnd) CacheBlockLRUEnd->LRUNext = pcb;
                                CacheBlockLRUEnd        =       pcb;
                                if (!CacheBlockLRUHead) CacheBlockLRUHead = pcb;
                        } if (position == LINK_POSITION_TOP) {
                                if (pcb == CacheBlockLRUHead)
                                        CacheBlockLRUHead = CacheBlockLRUHead->LRUNext;
                                pcb->LRUNext            =       CacheBlockLRUHead;
                                pcb->LRUBack            =       0;
                                if (CacheBlockLRUHead)
                                        CacheBlockLRUHead->LRUBack      =       pcb;
                                CacheBlockLRUHead       =       pcb;
                                if (!CacheBlockLRUEnd) CacheBlockLRUEnd = pcb;
                        }
                } if (flags & CACHE_LINK_TYPE_FILE) {
                        if (pcb->FileCBNext || pcb->FileCBBack)
                                CBUnlink (pcb, CACHE_LINK_TYPE_FILE);

// Only move files to the top reguardless of position setting
                        if (pcb == fib->CacheHead) {
```

Copyright 1995 Novell, Inc.  All Rights Reserved.

```
                    fib->CacheHead = fib->CacheHead->FileCBNext;
            }
            pcb->FileCBNext        =     fib->CacheHead;
            pcb->FileCBBack        =     0;
            if (fib->CacheHead) fib->CacheHead->FileCBBack = pcb;
            fib->CacheHead         =     pcb;
        }
        NiosPopfd (stateInfo);
    } else {
        #if DEBLEVEL > 0
            NiosPrintf     (FileDirHandle,   NiosSystemFlags    &
SF_DEBUGGER_PRESENT_BIT ?
                MT_DEBUG_OUT : MT_ALERT,
                "\r\nCBLink with no cache block passed.");

DebugBadThing (0xCBBAD);      // "CB BAD"
        #endif
    }
    return;
}
```

Copyright 1995 Novell, Inc. All Rights Reserved.

```
//!────────────────────────────────────────────────────────────────────
//      Private API:
//
        VOID                                //      No return value
CBMakeDirty (                               //      Increments dirty counts,
                                            //      sets dirty and valid offsets
        CacheBlock *pcb,                    //      ->      Address of cache block
        UINT32 dirtyStart,                  //      ->      Dirty cache block offset start
        UINT32 dirtyEnd                     //      ->      Dirty cache block offset end
        )
//
//      Return Values:
//              none
//
//      Async Service:
//              Yes
//
//      Comments:
//
//!────────────────────────────────────────────────────────────────────
{
        if (dirtyEnd > pcb->DirtyEnd) {
                if (!pcb->DirtyEnd) {
                        pcb->DirtyStart = dirtyStart;
                        pcb->FibOwner->DirtyBlocks++;
                        AnyDirtyBlocks++;
                }
                pcb->DirtyEnd = dirtyEnd;
        }
        if (pcb->DirtyStart > dirtyStart)     pcb->DirtyStart   = dirtyStart;
        if (!pcb->ValidEnd)                   pcb->ValidStart   = dirtyStart;
        if (dirtyEnd > pcb->ValidEnd)         pcb->ValidEnd     = dirtyEnd;
        if (pcb->ValidStart > dirtyStart)     pcb->ValidStart   = dirtyStart;

return;
}
```

53

Copyright 1995 Novell, Inc.  All Rights Reserved.

```
//!--------------------------------------------------------------
//      Private API:
//
        VOID                                    //      No return value
CBMakeGreyDirty (                               //      Changes grey data to dirty
        CacheBlock *pcb                         //      ->      Address of cache block
        )
//
//      Return Values:
//              none
//
//      Async Service:
//              Yes
//
//      Comments:
//              This function is usually used after auto-reconnect has reestablished
//              files that had previously written dirty data which then had become
//              'grey'.
//
//!--------------------------------------------------------------
{
        if (pcb->GreyEnd) {
                if (!pcb->DirtyEnd) {
                        pcb->FibOwner->DirtyBlocks++;
                        AnyDirtyBlocks++;
                } pcb->DirtyStart    =    pcb->GreyStart;
                pcb->DirtyEnd      =    pcb->GreyEnd;

pcb->FibOwner->GreyBlocks--;
                AnyGreyBlocks--;

pcb->GreyStart     =    pcb->GreyEnd = 0;
        } return;
}
```

Copyright 1995 Novell, Inc. All Rights Reserved.

```
//!----------------------------------------------------------------
//      Private API:
//
//      VOID                  //      No return value
// CBReleaseOwner (           //      Flush buffer if dirty, verifies grey data, unlinks
//      CacheBlock *pcb       //      ->    Address of cache block
//      )
//
//      Return Values:
//              none
//
//      Async Service:
//              Yes
//
//      Comments:
//
//!----------------------------------------------------------------
{
        FileInfoBlock    *fib;
        GreyFileList     grey;

if (pcb) {
                // Unlink block from LRU
                CBUnlink (pcb, CACHE_LINK_TYPE_SYSTEM);

if (pcb->FibOwner) {
                        while (pcb->GreyEnd) {
                                grey.NumberOfFiles = 1;
                                grey.GreyFiles[0].Fib = fib;
                                grey.GreyFiles[0].NumberOfItems = 1;
                                grey.GreyFiles[0].GreyItems[0].FileOffsetLo
                                        = pcb->FileOffset + pcb->GreyStart;
                                grey.GreyFiles[0].GreyItems[0].FileOffsetHi = 0;
                                grey.GreyFiles[0].GreyItems[0].LengthLo
                                        = pcb->GreyEnd - pcb->GreyStart;
                                grey.GreyFiles[0].GreyItems[0].LengthHi = 0;

SESSTable.SESSWriteVerify (pcb->FibOwner, &grey);

if (fib->Flags & FIBSTATUS_CREATE_VERIFY) {
                                        fib->Flags &= ~FIBSTATUS_CREATE_VERIFY;
                                } if (!pcb->GreyEnd) break;

NiosSleep (1);
                        } if (pcb->FibOwner->Flags & FIBSTATUS_LONG_LIVED_STAGE) {
                                fib = pcb->FibOwner;
                                CBUnlink (pcb, CACHE_LINK_TYPE_FILE);
                                if (!(fib->CacheHead) && !FIBBusyCheck (fib)) {
                                        FIBFree (fib, FALSE);
                                }
                        } else {
                                if (pcb->DirtyEnd) CBFlush (pcb);
                        }

// Unlink block from file
                        CBUnlink (pcb, CACHE_LINK_TYPE_FILE);
                } pcb->FibOwner          =       0;
```

Copyright 1995 Novell, Inc. All Rights Reserved.

```
        pcb->FileOffset      =    0;
        pcb->FileCBNext      =    pcb->FileCBBack    =   0;
        pcb->ValidStart      =    pcb->ValidEnd      =   0;
    }
    return;
}
```

Copyright 1995 Novell, Inc.  All Rights Reserved.
```
//!————————————————————————————————————————————————————
//      Private API:
//
        VOID                    //      No return value
CBUnlink (                      //      Unlinks cache block from system and/or file list
        CacheBlock *pcb,        //      ->      Address of cache block
        UINT32 flags            //      ->      Specifies the link type to unlink from
                                //                      CACHE_LINK_TYPE_FILE
                                //                      CACHE_LINK_TYPE_SYSTEM
        )
//
//      Return Values:
//                      none
//
//      Async Service:
//                      Yes
//
//      Comments:
//
//!————————————————————————————————————————————————————
{
        UINT32                          stateInfo;

if (pcb) {
                stateInfo = NiosPushfdCli ();
                if (flags & CACHE_LINK_TYPE_SYSTEM) {
                        // Unlink block from LRU
                        if (CacheBlockLRUEnd == pcb) CacheBlockLRUEnd = pcb->LRUBack;
                        if (CacheBlockLRUHead == pcb) CacheBlockLRUHead = pcb->LRUNext;

if (pcb->LRUNext) pcb->LRUNext->LRUBack = pcb->LRUBack;
                        if (pcb->LRUBack) pcb->LRUBack->LRUNext = pcb->LRUNext;

pcb->LRUNext    =       pcb->LRUBack    = 0;
                } if (flags & CACHE_LINK_TYPE_FILE) {
                        // Unlink block from file
                        if (pcb->FibOwner) {
                                if (pcb->FibOwner->CacheHead == pcb) {
                                        pcb->FibOwner->CacheHead = pcb->FileCBNext;
                                }
                        } if (pcb->FileCBNext)
                                pcb->FileCBNext->FileCBBack = pcb->FileCBBack;
                        if (pcb->FileCBBack)
                                pcb->FileCBBack->FileCBNext = pcb->FileCBNext;

pcb->FileCBNext         =       pcb->FileCBBack         =       0;
                }

NiosPopfd (stateInfo);
        }
        return;
}
```

Copyright 1995 Novell, Inc. All Rights Reserved.

```
//!―――――――――――――――――――――――――――――――――――――――――――――――
//      Private API:
//
        VOID                            //      No return value
FIBDirtyGreyCBs (                       //      Re-marks grey buffers as dirty
                                        //      in specified file
        FileInfoBlock *fib              // -> FileInfoBlock entry for the file
        )
//
//      Return Values:
//              none
//
//      Async Service:
//              Yes
//
//      Comments:
//
//!―――――――――――――――――――――――――――――――――――――――――――――――
{
        CacheBlock       *pcb, *pcbNext;

RecordAction (fib, RA_DIRTY_GREY_CBS);   // update debug log pcb = fib->CacheHead;

while (pcb) {
                pcbNext = pcb->FileCBNext;
                CBMakeGreyDirty (pcb);
                pcb = pcbNext;
        } return;
}
```

Copyright 1995 Novell, Inc.  All Rights Reserved.

```
//!----------------------------------------------------------------
//      Private API:
//
        UINT32                  //      <-  Returns result value
FIBFlush (                      //      Flushes buffers owned by file
        FileInfoBlock *fib,     // ->   FileInfoBlock entry for the file
        UINT32 flags            //  ->    Any combination of the following
                                //          BACKGROUND_INDICATOR if calling
                                //          from background
                                //          APP_HANDLES_ERRORS for no critical
                                //          network errors
        )
//
//      Return Values:
//                  SUCCESS_CODE
//                  SERVICE_BUSY if called from background and connection was busy
//                  See NCPERROR.H for list of NCP codes
//
//      Async Service:
//                  Yes
//
//      Comments:
//
//!----------------------------------------------------------------
{
        UINT32                  movingOffset1;
        UINT32                  shouldMove, movedThisMuch;
        CacheBlock              *pcb1, *pcb2;
        UINT32                  returnCode;

RecordAction (fib, RA_FLUSH);

movingOffset1 = 0xFFFFFFFF;

if (fib->DirtyBlocks) {
                // Find the first dirty block to start our search with
                pcb1 = fib->CacheHead;
                while (pcb1) {
                        if (pcb1->DirtyEnd && pcb1->FileOffset < movingOffset1) {
                                movingOffset1 = pcb1->FileOffset;
                        }
                        pcb1 = pcb1->FileCBNext;
                } if (movingOffset1 == 0xFFFFFFFF) {
                        #if DEBLEVEL > 0
                        NiosPrintf (FileDirHandle,
                                NiosSystemFlags & SF_DEBUGGER_PRESENT_BIT ?
                                MT_DEBUG_OUT : MT_ALERT,
                                "\r\nRecoverable Error:   Dirty cache block underflow, location 2.\
                                \r\nFile %s may be corrupted.",
                                fib->DOSFileName[0]    ==    0    ?    fib->LongName    :
fib->DOSFileName);

PrintActionTrace (fib, "Cache block underflow 2");

DebugBadThing (0xD12770FF);     // "DIRTY OFF"
                        #endif fib->DirtyBlocks = 0;                  // Best effort to fix it
                        StatDirtyCountUnderflow++;
                }
```

Copyright 1995 Novell, Inc. All Rights Reserved.

```
        }
        while (fib->DirtyBlocks) {
                FIBFindTwoContiguous (fib, movingOffset1, &pcb1, &pcb2);
                if (pcb1 && !pcb1->DirtyEnd) {
                        pcb1 = 0;
                }
                if (pcb2 && !pcb2->DirtyEnd) {
                        pcb2 = 0;
                } if (pcb1 && pcb2) {         // Ensure both are contiguously dirty
                        if ( pcb1->DirtyEnd != CACHE_BLOCK_SIZE ||
                             pcb2->DirtyStart != 0)
                                pcb2 = 0;
                } if (pcb1) {
                        CBUnlink (pcb1, CACHE_LINK_TYPE_SYSTEM);
                        movedThisMuch = 0;
                        if (pcb2) {
                                CBUnlink (pcb2, CACHE_LINK_TYPE_SYSTEM);
                                shouldMove = pcb1->DirtyEnd - pcb1->DirtyStart +
                                                pcb2->DirtyEnd - pcb2->DirtyStart;

returnCode = WriteOrCritError (fib,
                                        (pcb1->FileOffset + pcb1->DirtyStart),
                                        (pcb1->DirtyEnd - pcb1->DirtyStart),
                                        (UINT8 *) (pcb1->Data + pcb1->DirtyStart),
                                        (pcb2->DirtyEnd - pcb2->DirtyStart),
                                        (UINT8 *) (pcb2->Data), &movedThisMuch, flags);
                        } else {
                                shouldMove = pcb1->DirtyEnd - pcb1->DirtyStart;

returnCode = WriteOrCritError (fib,
                                        (pcb1->FileOffset + pcb1->DirtyStart),
                                        shouldMove,
                                        (UINT8 *) (pcb1->Data + pcb1->DirtyStart),
                                        0, 0, &movedThisMuch, flags);
                        } if (returnCode) {
                                CBLink (pcb1, CACHE_LINK_TYPE_SYSTEM, LINK_POSITION_TOP);
                                if (pcb2) {
                                        CBLink (   pcb2,
                                                CACHE_LINK_TYPE_SYSTEM,
                                                LINK_POSITION_TOP);
                                }
                                return (returnCode);
                        }

CBCleanDirt (pcb1, VERIFY_DISK_UPDATE);

CBLink (pcb1, CACHE_LINK_TYPE_SYSTEM, LINK_POSITION_TOP);

if (pcb2) {
                                CBCleanDirt (pcb2, VERIFY_DISK_UPDATE);

CBLink (pcb2, CACHE_LINK_TYPE_SYSTEM, LINK_POSITION_TOP);
                        }
                } else pcb2 = 0;
```

Copyright 1995 Novell, Inc. All Rights Reserved.

```
        if (fib->DirtyBlocks > 0x80000000) {
            #if DEBLEVEL > 0
                NiosPrintf (FileDirHandle,
                        NiosSystemFlags & SF_DEBUGGER_PRESENT_BIT ?
                    MT_DEBUG_OUT : MT_ALERT,
                    "\r\nRecoverable Error: Dirty cache block underflow,
location 1.\
                    \r\nFile %s may be corrupted.",
                    fib->DOSFileName[0]  ==  0  ?  fib->LongName  :
fib->DOSFileName);

PrintActionTrace (fib, "Cache block underflow");

DebugBadThing (0xD12770FF);    // "DIRTY OFF"
            #endif fib->DirtyBlocks = 0;                // Best effort to fix it
            StatDirtyCountUnderflow++;
            break;
        } if (movingOffset1 > (fib->SizeLo + CACHE_BLOCK_SIZE)) { if DEBLEVEL > 0
                NiosPrintf (FileDirHandle,
                        NiosSystemFlags & SF_DEBUGGER_PRESENT_BIT ?
                    MT_DEBUG_OUT : MT_ALERT,
                    "\r\nRecoverable Error: Dirty cache block overflow,
location 1.\
                    \r\nFile %s may be corrupted.",
                    fib->DOSFileName[0]  ==  0  ?  fib->LongName  :
fib->DOSFileName);

PrintActionTrace (fib, "Cache block overflow");

DebugBadThing (0x700D1277);    // "TOO DIRTY"
            #endif

StatDirtyCountOverflow++;
            fib->DirtyBlocks = 0;                // Best effort to fix it
        } movingOffset1 += CACHE_BLOCK_SIZE;

if (pcb2) {   // We moved two blocks
            movingOffset1 += CACHE_BLOCK_SIZE;
        }
    } return (SUCCESS_CODE);
}
```

Copyright 1995 Novell, Inc.  All Rights Reserved.

```
//!————————————————————————————————————
//      Private API:
//
//      VOID                            //      No return value
// FIBFree (                            //      Zaps FileInfoBlock and links it for reuse
//      FileInfoBlock *fib,             // ->   FileInfoBlock entry for the file
//      BOOL releaseSema4               // ->   Flag indicating whether the semaphore
//                                      //      should be released or not
//      )
//
//      Return Values:
//              none
//
//      Async Service:
//              Yes
//
//      Comments:
//
//!————————————————————————————————————
{
        CacheBlock              *pcb, *pcbNext;
        UINT32                  index;

RecordAction (fib, RA_FREE_FIB);

pcb = fib->CacheHead;
        while (pcb) {
                pcbNext = pcb->FileCBNext;
                if (pcb->DirtyEnd) {
                        // Unlink block from LRU
                        CBUnlink (pcb, CACHE_LINK_TYPE_FILE | CACHE_LINK_TYPE_SYSTEM);

CBCleanDirt (pcb, NADA);
                        CBCleanGrey (pcb);

pcb->FibOwner           =       0;
                        pcb->FileOffset         =       0;
                        pcb->FileCBNext         =       pcb->FileCBBack         =       0;
                        pcb->ValidStart         =       pcb->ValidEnd           =       0;

// Put at bottom of LRU
                        CBLink (pcb, CACHE_LINK_TYPE_SYSTEM, LINK_POSITION_BOTTOM);
                }
                pcb = pcbNext;
        }

// Clear out any LockInfoBlocks (leases) allocated to this file if any
        if (fib->LockHead) ClearOutFIBLocks (fib);

for (index = 0; index < MAX_FIB_PROCESSES; index++) {
                fib->ProcessID[index] = 0;
                fib->OpenCount[index] = 0;
        } fib->TotalOpenCount     = 0;

fib->DirtyBlocks        = 0;
        fib->ConnHandle         = 0;

if (fib->OrigPath) {
                NiosFree (FileDirHandle, fib->OrigPath);
                fib->OrigPath = 0;
        }
```

Copyright 1995 Novell, Inc. All Rights Reserved.

```
        if (fib->LongName) {
                NiosFree (FileDirHandle, fib->LongName);
                fib->LongName = 0;
        } if (fib->Flags & FIBSTATUS_CLOSED_BEHIND_STAGE) {
                StatCloseBehindsActive--;
                fib->Flags &= ~FIBSTATUS_CLOSED_BEHIND_STAGE;
        } if (fib->Flags & FIBSTATUS_LONG_LIVED_STAGE) {
                StatFilesInLongLivedState--;
                fib->Flags &= ~FIBSTATUS_LONG_LIVED_STAGE;
        } if (fib->Flags & FIBSTATUS_RECONNECT_FAILED) {
                fib->Flags &= ~FIBSTATUS_RECONNECT_FAILED;
        } if (releaseSema4) {
                FIBCheckIn (fib);
        }

CHUNKLink (&FibHead, (VOID *) fib, LINK_TYPE_FREE, LINK_POSITION_BOTTOM);

return;
}
```

Copyright 1995 Novell, Inc.  All Rights Reserved.

```
//!----------------------------------------------------------------
//      Private API:
//
        VOID                            //      No return value
FIBWhitenGreyCBs (                      //      Unmarks grey buffers associated with
                                        //      specified file
            FileInfoBlock *fib          // -> FileInfoBlock entry for the file
        )
//
//      Return Values:
//                  none
//
//      Async Service:
//                  Yes
//
//      Comments:
//
//!----------------------------------------------------------------
{
        CacheBlock          *pcb, *pcbNext;

RecordAction (fib, RA_WHITEN_GREY_CBS);

pcb = fib->CacheHead;

while (pcb) {
                pcbNext = pcb->FileCBNext;
                CBCleanGrey (pcb);
                pcb = pcbNext;
        } return;
}
```

Copyright 1995 Novell, Inc. All Rights Reserved.

```
//!----------------------------------------------------------------
//     Public API:
//
       UINTXX DIST              //    <-    Returns result value
FILECommit (                    //          Commits specified files dirty write buffers
       UINT32 pgID,             //    ->    Process Group ID of the calling
                                //          Process Group
       UINT32 processID,        //    ->    Process ID of the calling process
       UINT32 fibHandle         //    ->    Alias file handle
       )
//
//     Return Values:
//                SUCCESS_CODE
//                INVALID_FILE_HANDLE
//                See NCPERROR.H for list of NCP codes
//
//     Async Service:
//                Yes
//
//     Comments:
//
//!----------------------------------------------------------------
{
       NDateTime              dateTime;
       FileInfoBlock          *fib;
       UINT32                        returnCode;

returnCode = HandleToFIB (pgID, processID, fibHandle, &fib);
       if (returnCode) return (returnCode);

RecordAction (fib, RA_COMMIT);

FIBCheckOut (fib);
       returnCode = SUCCESS_CODE;

FIBFlush (fib, NADA);

if (fib->Flags & FIBSTATUS_UPDATE_DATE_TIME) {
              if (fib->Flags & FIBSTATUS_FETCH_DATE_TIME) {
                     NiosGetDateTime (&dateTime);
                     ChangeNiosChronToDOS (&dateTime, &fib->UpdateDate,
                            &fib->UpdateTime);
              }
              returnCode = SESSTable.SESSSetDateTime (fib,
                     fib->Flags & FIBSTATUS_NO_CRITICAL_ERROR ? APP_HANDLES_ERRORS :
0);

if (returnCode) goto CommonExit;

fib->Flags      &=    ~(FIBSTATUS_UPDATE_DATE_TIME    |
FIBSTATUS_FETCH_DATE_TIME);
       } if (TrueCommit) {
              // This ensures server flushes also

RecordAction (fib, RA_TRUE_COMMIT);

returnCode = SESSTable.SESSCommitFile (fib,
                     fib->Flags & FIBSTATUS_NO_CRITICAL_ERROR ? APP_HANDLES_ERRORS :
0);

if (returnCode) goto CommonExit;
```

Copyright 1995 Novell, Inc.  All Rights Reserved.

```
            // Clean all of the grey data since we know the server's disk has it
            FIBWhitenGreyCBs (fib);
     } if (fib->Flags & FIBSTATUS_CREATE_VERIFY) {
            fib->Flags &= ~FIBSTATUS_CREATE_VERIFY;
     }
CommonExit:
     FIBCheckIn (fib);

return (returnCode);
}
```

Copyright 1995 Novell, Inc. All Rights Reserved.

```
typedef struct FileInfoBlockTag {
        struct      ResourceLinkTag;    // 00h
        semHandle   Semaphore;          // 18h
        CONN_HANDLE ConnHandle;         // 1Ch
        UINT32      Future1;            // 20h
        UINT32      Future2;            // 24h
        UINT32      ServerVersion;      // 28h
        UINT32      TotalOpenCount;     // 2Ch
        UINT32      Flags;              // 30h
        UINT32      FileHandle[2];      // 38h (NCP 6 byte handle is 00 00
                                        //      FileHandle[0])
        UINT32      Attributes;         // 3Ch
        UINT32      SizeLo;             // 40h
        UINT32      SizeHi;             // 44h
        UINT16      CreationTime;       // 48h
        UINT16      CreationDate;       // 4Ah
        UINT16      UpdateTime;         // 4Ch
        UINT16      UpdateDate;         // 4Eh
        UINT16      AccessTime;         // 50h
        UINT16      AccessDate;         // 52h
        UINT32      VolumeID;           // 54h
        UINT32      NSDirBase;          // 58h
        UINT32      DOSDirBase;         // 5Ch
        UINT32      OrigNSDirBase;      // 60h
        UINT32      SeekPositionLo;     // 64h
        UINT32      SeekPositionHi;     // 68h
        UINT32      AccessRights;       // 6Ch
        UINT32      UniqueID;           // 70h
        UINT32      NameSpace;          // 74h
        UINT32      FATTimeStamp;       // 78h (verifies updates on the
                                        //   server so that we can remove
                                        //     TRUE COMMIT = ON for the
                                        //   auto-reconnect files case)
        UINT32      ClosedTicks;        // 7Ch
        UINT32      CacheMisses;        // 80h
        UINT32      DodgeSize;          // 84h
        UINT32      DirtyBlocks;        // 88h
        UINT32      GreyBlocks;         // 8Ch
        UINT32      ReadAheadPoint;     // 90h
        UINT32      WriteBehindPoint;   // 94h
        UINT32      PG_ID;              // 98h
        UINT32      ProcessID[MAX_FIB_PROCESSES]; //     9Ch
        UINT32      OpenCount[MAX_FIB_PROCESSES];
        struct      CacheBlockTag   *CacheHead;
        struct      LockInfoBlockTag *LockHead;
        VOID        (*CallWhenNotBusy)(struct FileInfoBlockTag *fib);
        UINT8       DOSFileName[16];
        UINT32      LongNameLength;
        UINT8       *LongName;
        UINT8       *OrigPath;
        UINT8       *LastAction;
        UINT8       *ActionTrace;
        struct      IoAsyncBlockTag;
} FileInfoBlock;
```

Copyright 1995 Novell, Inc.  All Rights Reserved.

```
typedef struct QuickPathTag {
      CONN_HANDLE ConnHandle;                               // 00h
      UINT32       OwningModule;                            // 04h
      UINT8        *RealStartOffset;                        // 08h
      UINT8        *FileNameOffset;                         // 0Ch
      UINT32       PathLength;                              // 10h
      UINT32       Depth;                                   // 14h
      UINT32       VolumeID;                                // 18h
      UINT32       NSDirBase;                               // 1Ch
      UINT32       NameSpace;                               // 20h
      UINT8        DirHandle8;                              // 24h
      UINT8        DirTag;                                  // 25h
      UINT8        OrigPathType;                            // 26h
      UINT8        Path[MAX_PATH_LENGTH + MAX_SERVER_NAME_LENGTH]; // 27h
} QuickPath;
```

Copyright 1995 Novell, Inc.  All Rights Reserved.

```
//!-----------------------------------------------------------
//      Private API:
//
        static
        UINT32                          //    <-    Returns result value
ReestablishConnection (                 //          Auto-reconnect resources to connection
        NESL_ECB *consumerNecb,         //          Not used
        NESL_ECB *producerNecb,         //          Not used
        CONN_HANDLE connHandle          //    ->    Connection handle being reconnected
        )
//
//      Return Values:
//                      NESL_EVENT_NOT_CONSUMED
//
//      Async Service:
//                      No
//
//      Comments:
//                      Called as result of ping event that finds client again
//!-----------------------------------------------------------
{
        FileInfoBlock           *fib;

UNREFERENCED_PARAMETER (consumerNecb);
        UNREFERENCED_PARAMETER (producerNecb);

if (ReestablishDirsToConnection (connHandle) == AUTO_RECONNECT_FAILURE) {
                return (NESL_EVENT_NOT_CONSUMED);
        } fib = (FileInfoBlock *) FibHead.ChunkHead;

while (fib) {
                if (fib->LinkType == LINK_TYPE_USED
                &&      fib->ConnHandle == connHandle
                &&      !(fib->Flags & FIBSTATUS_BUSY_ALLOCATING)) { if (fib->TotalOpenCount > 0) {
                                ReOpenCreateFile (fib);
                        } else if (fib->Flags & FIBSTATUS_CLOSED_BEHIND_STAGE) {
                                if (fib->DirtyBlocks || fib->GreyBlocks) {
                                        ReOpenCreateFile (fib);
                                } else {
                                        if (!FIBBusyCheck (fib)) {
                                                FIBFree (fib, FALSE);
                                        }
                                }
                        }
                } fib = (FileInfoBlock *) fib->ChunkNext;
        } return (NESL_EVENT_NOT_CONSUMED);
}
```

Copyright 1995 Novell, Inc. All Rights Reserved.

```
//!----------------------------------------------------------------
//      Friend API:
//
//      UINT32                      //    <-   Returns result value
// ReestablishDirsToConnection (    //   Auto-reconnect dir handles to connection
//      CONN_HANDLE connHandle      // -> Connection handle being reconnected
//      )
//
//      Return Values:
//              SUCCESS_CODE
//
//      Async Service:
//              No
//
//      Comments:
//              Calls NetWare Core Protocol functions mux'd thru SESSTable
//!----------------------------------------------------------------
{
        DirInfoBlock       *dib, *dibNext;
        SearchInfoBlock    *sib;
        QuickPath          *quickPath;
        DriveUpdateEvent   driveUpdateEvent;
        UINT8              wasteByte;
        UINT32             returnCode;

quickPath = 0;
        wasteByte = 0;

dib = dibNext = (DirInfoBlock *) DibHead.ChunkHead;

while (dib) {
                dib = dibNext;
                if (dib->LinkType    == LINK_TYPE_USED
                &&  dib->ConnHandle  == connHandle
                && !(dib->Flags & DIB_BUSY_ALLOCATING)) { if (dib->NSDirBase    == UNKNOWN_DIR_BASE
                        ||  dib->DOSDirBase   == UNKNOWN_DIR_BASE    ) {
                                // Can't reestablish if no 32bit dir handle
                                CantRedoDir (dib, BECAUSE_NO_SERVER_SUPPORT);
                                continue;
                        } if (AutoReconnect < AUTO_RECONNECT_DEVICES) {
                                CantRedoDir (dib, BECAUSE_LEVEL_TOO_LOW);
                                continue;
                        } if (!quickPath) {
                                quickPath    =    (QuickPath    *)    NiosShortTermAlloc
 (FileDirHandle, sizeof(QuickPath));
                                if (!quickPath) {
                                        CantRedoDir (dib, BECAUSE_LOW_ON_MEMORY);
                                        continue;
                                }
                        } quickPath->ConnHandle       = dib->ConnHandle;
                        quickPath->RealStartOffset  = &wasteByte;
                        quickPath->FileNameOffset   = &wasteByte;
                        quickPath->PathLength       = 0;
                        quickPath->Depth            = dib->FakeRootDepth;
                        quickPath->VolumeID         = dib->VolumeID;
```

Copyright 1995 Novell, Inc. All Rights Reserved.

```
                quickPath->NSDirBase       = dib->NSDirBase;
                quickPath->DirHandle8      = dib->DirHandle8;
                quickPath->NameSpace       = dib->NameSpace;
                quickPath->DirTag          = dib->DirHandleName;
                quickPath->OrigPathType    = PATH_TYPE_RELATIVE;

returnCode = SESSTable.SESSAllocDirHandle (quickPath, dib);

switch (returnCode) {
                case SUCCESS_CODE:
                        driveUpdateEvent.PG_ID         = dib->PG_ID;
                        driveUpdateEvent.ProcessID     = dib->ProcessID;
                        driveUpdateEvent.ConnHandle    = dib->ConnHandle;
                        driveUpdateEvent.DirHandle     = dib->AliasHandle;
                        driveUpdateEvent.Depth         = dib->CDDepth;
                        driveUpdateEvent.DirHandleRaw8 = dib->DirHandle8;
                        driveUpdateEvent.DirHandleType =   (dib->Flags     &
DIB_USER_VISIBLE_MASK);
                        driveUpdateEvent.DirHandleName = dib->DirHandleName;
                        driveUpdateEvent.Reserved      = 0;

NESLProduceEvent (&DriveChangedNecb, 0, &driveUpdateEvent);
                        break;

case NCP_INVALID_PATH:
                        CantRedoDir (dib, BECAUSE_DELETED_WHILE_GONE);
                        break;

case NCP_ACCESS_DENIED:
                        CantRedoDir (dib, BECAUSE_ACCESS_DENIED);
                        break;

case AUTO_RECONNECT_FAILURE:
                        return (returnCode);

default:
                        CantRedoDir (dib, returnCode);
                        break;
                }
        }
        dibNext = (DirInfoBlock *) dib->ChunkNext;
    } sib = (SearchInfoBlock *) SibHead.ChunkHead;

while (sib) {
        if (sib->LinkType      == LINK_TYPE_USED
        &&  sib->ConnHandle    == connHandle) { if (!(sib->StateFlags & DIRSTATE_RECONNECTABLE)) {
                        // Can't reestablish this one
                        FreeSIB (sib);
                }
        }
        sib = (SearchInfoBlock *) sib->ChunkNext;
    } if (quickPath) NiosFree (FileDirHandle, quickPath);

return (NESL_EVENT_NOT_CONSUMED);
}
```

Copyright 1995 Novell, Inc.  All Rights Reserved.

```
//!─────────────────────────────────────────────────────────────
//      Private API:
//
        static
        VOID                            //    No output
ReOpenCreateFile (                      //    Reopens file or prints alert if fails
        FileInfoBlock *fib              // -> FileInfoBlock entry for the file
        )
//
//      Return Values:
//                  None
//
//      Async Service:
//                  No
//
//      Comments:
//
//!─────────────────────────────────────────────────────────────
{
        QuickPath          *quickPath;
        BOOL                inUseDuringAuto;
        UINT32              returnCode;

quickPath = 0;

if (fib->Flags & FIBSTATUS_BUILT_RAW) {
              // Can't reestablish if built by FILEBuildFIB
              CantRedoFile (fib, BECAUSE_OLD_UTILITY_RAW_FILE);
              return;
        } if (fib->NSDirBase == UNKNOWN_DIR_BASE ||
            fib->DOSDirBase == UNKNOWN_DIR_BASE) {
              // Can't reestablish if no 32bit dir handle
              CantRedoFile (fib, BECAUSE_NO_SERVER_SUPPORT);
              return;
        } if (AutoReconnect < AUTO_RECONNECT_DEVICES_RO_FILES) {
              CantRedoFile (fib, BECAUSE_LEVEL_TOO_LOW);
              return;
        } if (AutoReconnect == AUTO_RECONNECT_DEVICES_RO_FILES
        &&    (fib->Flags & FIBSTATUS_EVER_WRITTEN_TO
        &&    !(fib->AccessRights & NW_FACC_WRITE_THROUGH)
        ||    fib->LockHead)) {

// Shouldn't attempt to open it with out the O.K.
              CantRedoFile (fib, BECAUSE_LEVEL_TOO_LOW);
              return;
        } quickPath = (QuickPath *) NiosShortTermAlloc (   FileDirHandle,
                                                         sizeof(QuickPath));
        if (!quickPath) {
              CantRedoFile (fib, BECAUSE_LOW_ON_MEMORY);
              return;
        } if (FIBBusyCheck (fib)) {
              inUseDuringAuto = TRUE;
        } else {
```

Copyright 1995 Novell, Inc.  All Rights Reserved.

```
        inUseDuringAuto = FALSE;
        FIBCheckOut (fib);
}

RecordAction (fib, RA_REESTABLISH_FILE);

// Reopen or recreate the file
quickPath->ConnHandle       = fib->ConnHandle;
quickPath->RealStartOffset  = &quickPath->Path;
quickPath->FileNameOffset   = &quickPath->Path;
quickPath->PathLength       = 0;
quickPath->Depth            = 0;
quickPath->VolumeID         = fib->VolumeID;
quickPath->NSDirBase        = fib->NSDirBase;
quickPath->NameSpace        = fib->NameSpace;
quickPath->Path[0]          = 0;

returnCode = SESSTable.SESSOpenFile (fib->AccessRights, fib->Attributes,
        quickPath, fib);

if (returnCode) { if (returnCode == AUTO_RECONNECT_FAILURE) { return; }
        if (fib->Flags & FIBSTATUS_CREATE_VERIFY) {
                // Maybe we were creating it and it didn't make it to the
                // server's disk yet
                returnCode = SESSTable.SESSCreateFile (fib->AccessRights,
                        CREATE_NEW_REGUARDLESS, fib->Attributes, quickPath, fib);
                if (returnCode) {
                        CantRedoFile (fib, BECAUSE_CANT_RECREATE_IT);
                }
        } else {
                if (returnCode == NCP_NO_FILES_FOUND_ERROR) {
                        CantRedoFile (fib, BECAUSE_DELETED_WHILE_GONE);
                } else {
                        CantRedoFile (fib, BECAUSE_ACCESS_DENIED);
                }
        }
} if (!returnCode) {
        // Establish any file locks that were present
        returnCode = LockLeaseTerminated (fib);
        if (returnCode) {
                // The re-locking failed, so try to close the file
                if (!inUseDuringAuto) {
                        // We can only close the file if it wasn't
                        // busy because the async
                        // close may blow away the async read or
                        // write in progress
                        FILEClose ( fib->PG_ID,
                                    fib->ProcessID[0],
                                    fib->AliasHandle);
                }

CantRedoFile (fib, BECAUSE_CANT_RELOCK_IT);

} else {
                if (fib->Flags & FIBSTATUS_AUTO_ENFORCE_SIZE) {
                        // We may have auto-reconnected before the truncation
                        // of the file size occurred TruncateFile (fib, NADA);
```

Copyright 1995 Novell, Inc.  All Rights Reserved.

```
            }
        }
    } if (!returnCode) {
        FIBDirtyGreyCBs (fib);
    } if (!inUseDuringAuto) {
        // We checked it out so check it back in
        FIBCheckIn (fib);
    } if (quickPath) NiosFree (FileDirHandle, quickPath);

return;
}
```

Copyright 1995 Novell, Inc.  All Rights Reserved.

```
//!─────────────────────────────────────────────────────────────
//      Private API:
//
         VOID                         //   No return value
TruncateFile (                        //   Truncate the file at the current size
         FileInfoBlock *fib,          //   ->   FileInfoBlock entry for the file
         UINT32 flags                 //   ->   Any combination of the following
                                      //        ASYNC_OPERATION to return immediately
                                      //        BACKGROUND if called from background
         )
//
//      Return Values:
//                 None
//
//      Async Service:
//                 No
//
//      Comments:
//
//!─────────────────────────────────────────────────────────────
{
         UINT32                       cbOffset, modOffset;
         CacheBlock             *pcb, *pcbNext;

RecordAction (fib, RA_TRUNCATE);

//    Invalidate any buffers past length
         modOffset    =     fib->SeekPositionLo % CACHE_BLOCK_SIZE;
         cbOffset     =     fib->SeekPositionLo - modOffset;

pcb = fib->CacheHead;
         while (pcb) {
                 pcbNext = pcb->FileCBNext;
                 if (pcb->FileOffset == cbOffset) {
                         // End of file lands in middle of cache block
                         if (pcb->DirtyEnd) {
                                 if (pcb->DirtyStart >= modOffset) {
                                         // End of file lands on or before dirty data start
                                         CBCleanDirt (pcb, NADA);
                                 } else {
                                         if (pcb->DirtyEnd > modOffset) {
                                                 // End of file lands in middle of dirty block
                                                 pcb->DirtyEnd = modOffset;
                                         }
                                 }
                         }
                         // End of file lands in middle of cache block with grey data
                         if (pcb->GreyEnd) {
                                 if (pcb->GreyStart >= modOffset) {
                                         // End of file lands on or before dirty data start
                                         CBCleanGrey (pcb);
                                 } else {
                                         if (pcb->GreyEnd > modOffset) {
                                                 // End of file lands in middle of grey data
                                                 pcb->GreyEnd = modOffset;
                                         }
                                 }
                         }
                         if (pcb->ValidEnd) {
                                 if (pcb->ValidStart >= modOffset) {
                                         // End of file lands on or before valid data start
                                         CBFree (pcb);
```

Copyright 1995 Novell, Inc. All Rights Reserved.

```
                    } else {
                            if (pcb->ValidEnd > modOffset) {
                                    // End of file lands in middle of valid data
                                    pcb->ValidEnd = modOffset;
                            }
                    }
            }
            } else if (pcb->FileOffset > cbOffset) {
                    if (pcb->DirtyEnd) {
                            CBCleanDirt (pcb, NADA);
                    }
                    if (pcb->GreyEnd) {
                            CBCleanGrey (pcb);
                    }
                    CBFree (pcb);
            }
            pcb = pcbNext;
    } fib->SizeLo = fib->SeekPositionLo;
    fib->SizeHi = fib->SeekPositionHi;

fib->WriteBehindPoint = fib->SeekPositionLo;

SESSTable.SESSWriteFile (fib, fib->SizeLo, 0, 0, 0, 0,
            &fib->UserStorage[2], flags & BACKGROUND ?
            BACKGROUND_INDICATOR | APP_HANDLES_ERRORS : 0,
            flags & ASYNC_OPERATION ? FinishTruncate : 0);

RecordAction (fib, RA_TRUNCATE_RETURNED);

if (!(flags & ASYNC_OPERATION)) {
            RecordAction (fib, RA_TRUNCATE_FINISH_4GROUND);
    } fib->Flags |= FIBSTATUS_AUTO_ENFORCE_SIZE & FIBSTATUS_READ_AHEAD_DONE;

return;
}
```

76

What is claimed and desired to be secured by patent is:

1. A method for assisting the recovery of files in a computer network after a network fault occurs, the network including a file server and a client connected to the file server, the client including a client cache data block and a corresponding client block state indicator, the file server including a server cache data block and a non-volatile store, the non-volatile store including a controller and a non-volatile medium, said method comprising the following steps in the order indicated:

client-caching a specified piece of file data by writing the file data to the client cache data block;

indicating that client-caching is complete by updating the client block state indicator;

server-caching the file data by writing the file data to the server cache data block;

indicating that server-caching is complete by updating the client block state indicator;

requesting storage of the file data by writing the file data to the controller in the file server;

receiving an acknowledgement from the controller that the file data has been stored on the non-volatile medium; and indicating that storing is complete by updating the client block state indicator.

2. The method of claim 1, further comprising the steps of:

reconnecting the client to the file server after the network fault occurs;

determining that the client block state indicator indicates that server-caching is complete and that storing is not complete; and changing the client block state indicator to indicate instead that client-caching is complete and that server-caching is not complete.

3. The method of claim 2, wherein said reconnecting step is followed by the step of re-establishing a client directory with the server.

4. The method of claim 2, wherein said reconnecting step is followed by the step of re-opening a file that is stored on the server store.

5. The method of claim 2, wherein said reconnecting step is followed by the step of creating a new instance of a file that is stored on the server store.

6. The method of claim 2, wherein said reconnecting step is followed by the step of truncating a file that is stored on the server store.

7. The method of claim 1, wherein the network fault occurs after said step of indicating that server-caching is complete and before said step of indicating that storing is complete, and wherein said method further comprises the following steps after said step of indicating that server-caching is complete and before said step of indicating that storing is complete:

reconnecting the client to the file server; and then trying again to store the file data by performing said steps of server-caching, indicating that server-caching is complete, requesting storage, and receiving an acknowledgement, regardless of whether any of said steps were also performed before the network fault occurred.

8. The method of claim 1, wherein said client-caching step occurs in response to a disk write-through requesting step by a process that resides on the client, and said method further comprises the steps of:

suspending execution of the process after said disk write-through requesting step; and resuming execution of the process after said step of indicating that storing is complete.

9. The method of claim 8, further comprising the step of sending the file server a rush signal corresponding to the file data, the rush signal being sent before said resuming step.

10. The method of claim 1, wherein the file data is destined for storage in a file on the non-volatile medium in the file server, and said method further comprises the steps of:

storing an instance identification of the file on the non-volatile medium in the file server;

updating an instance identification of the file in the client cache after said server-caching step; and comparing the instance identification in the client cache with the instance identification stored on the non-volatile medium after a network fault occurs to determine whether the instance identifications correspond to one another.

11. The method of claim 10, further comprising the step of updating the instance identification stored on the non-volatile medium after said step of receiving an acknowledgement from the controller, said updating making the instance identification on the non-volatile medium correspond to the instance identification in the client cache.

12. The method of claim 10, wherein said steps of storing an instance identification and updating an instance identification comprise storing a modification count and updating a modification count, respectively.

13. The method of claim 10, wherein said comparing step determines that the instance identifications do not correspond to one another and that the file was not modified after the network fault occurred, and wherein said method further comprises the step of trying again to store the file data by performing said steps of server-caching, indicating that server-caching is complete, requesting storage, and receiving an acknowledgement, regardless of whether any of said steps were also performed before the network fault occurred.

14. The method of claim 10, wherein said comparing step determines that the instance identifications do not correspond to one another and that the file was modified after the network fault occurred, and wherein said method further comprises the step of storing the file data in a new instance of at least a portion of the file.

15. The method of claim 14, wherein said step of storing the file data in a new instance comprises performing said steps of server-caching, indicating that server-caching is complete, requesting storage, and receiving an acknowledgement, regardless of whether any of said steps were also performed before the network fault occurred.

16. The method of claim 1, wherein the file data is destined for storage in a file on the non-volatile medium in the file server, and said method further comprises the steps of:

storing a lock identification of the file in the client, the lock identification identifying at least one lock region of the file;

reconnecting the client to the file server after a network fault occurs; and then relocking the lock region of the file.

17. The method of claim 16, wherein said relocking step is followed by the steps of:

determining that the client block state indicator indicates than server-caching is complete and that storing is not complete; and changing the client block state indicator to indicate instead that client-caching is complete and that server-caching is not complete.

18. The method of claim 16, wherein said relocking step is followed by the step of performing said steps of server-caching, indicating that server-caching is complete, requesting storage, and receiving an acknowledgement, regardless of whether any of said steps were also performed before the network fault occurred.

19. The method of claim 1, further comprising the steps of:
   storing a semaphore identification in the client, the semaphore identification identifying at least one resource which is claimed by a process residing on the client;
   reconnecting the client to the file server after a network fault occurs; and then
   resubmitting the semaphore identification to the file server to reclaim at least one resource after a network fault occurs.

20. An apparatus for assisting the recovery of files in a computer network after a network fault occurs, said apparatus comprising:
   a file server having a non-volatile store;
   a client connected to the file server by at least a portion of the network;
   a client cache in the client, the client cache including a client cache data block for holding a piece of file data and a corresponding block state indicator;
   a server cache in the server, the server cache including a server cache data block for holding the file data and a corresponding dirty flag;
   client-cached updating means for updating the block state indicator to indicate that client-caching is complete after the file data is written to the client cache data block;
   server-cached updating means for updating the block state indicator to indicate that server-caching is complete after the file data is written to the server cache data block; and
   server-stored updating means for updating the block state indicator to indicate that server-storing is complete after the file data is written to the server store.

21. The apparatus of claim 20, further comprising:
   means for reconnecting the client to the file server after the network fault occurs;
   means for determining that the block state indicator indicates that server-caching is complete and that storing is not complete; and
   means for changing the client block state indicator to indicate instead that client-caching is complete and that server-caching is not complete.

22. The apparatus of claim 21, further comprising means for creating a new instance of a file that is stored on the server store.

23. The apparatus of claim 20, further comprising:
   means for reconnecting the client to the file server and
   means for flushing the file data from the client cache through the server cache to the server store.

24. The apparatus of claim 20, further comprising:
   disk write-through requesting means capable of being called by a process that resides on the client;
   means for suspending execution of the process in response to a call to said disk write-through requesting means; and
   means for resuming execution of the process after storing of the file data on the server store is complete.

25. The apparatus of claim 24, further comprising means for sending the file server a rush signal corresponding to the file data.

26. The apparatus of claim 20, further comprising:
   means for storing an instance identification of the file on a non-volatile medium in the file server;
   means for updating an instance identification of the file in the client cache after server-caching the file data; and
   means for comparing the instance identification in the client cache with the instance identification stored on the non-volatile medium after a network fault occurs to determine if the instance identifications correspond to one another.

27. The apparatus of claim 26, further comprising means for updating the instance identification stored on the non-volatile medium after receiving an acknowledgement that the file data is stored on the server store, such that the instance identification on the non-volatile medium corresponds to the instance identification in the client cache.

28. The apparatus of claim 26, wherein said means for storing an instance identification and said means for updating an instance identification comprise means for storing a modification count and means for updating a modification count, respectively.

29. The apparatus of claim 26, further comprising means for flushing the file data from the client cache through the server cache to the server store.

30. The apparatus of claim 26, further comprising means for storing the file data in a new instance of at least a portion of the file.

31. The apparatus of claim 20, further comprising:
   means for storing a lock identification of a file in the client, the lock identification identifying at least one lock region of the file;
   means for reconnecting the client to the file server after a network fault occurs; and
   means for relocking the lock region of the file.

32. The apparatus of claim 31, wherein said means for relocking comprises:
   means for determining that the block state indicator indicates that server-caching is complete and that storing is not complete; and
   means for changing the block state indicator to indicate instead that client-caching is complete and that server-caching is not complete.

33. The apparatus of claim 31, further comprising means for flushing the file data from the client cache through the server cache to the server store.

34. The apparatus of claim 20, further comprising:
   means for storing a semaphore identification in the client, the semaphore identification identifying at least one resource which is claimed by a process residing on the client;
   means for reconnecting the client to the file server after a network fault occurs; and
   means for resubmitting the semaphore identification to the file server to reclaim at least one resource after a network fault occurs.

35. A computer-readable storage medium having a configuration that represents data and instructions which cause a client and a file server to perform method steps for assisting the recovery of files after a network fault occurs, the client connected to the server in a computer network, the client including a client cache data block and a corresponding client block state indicator, the file server including a server cache data block and a non-volatile store, the non-volatile store including a controller and a non-volatile medium, the method comprising the following steps in the order indicated:

client-caching a specified piece of file data by writing the file data to the client cache data block;

indicating that client-caching is complete by updating the client block state indicator;

server-caching the file data by writing the file data to the server cache data block;

indicating that server-caching is complete by updating the client block state indicator;

requesting storage of the file data by writing the file data to the controller in the file server;

receiving an acknowledgement from the controller that the file data has been stored on the non-volatile medium; and indicating that storing is complete by updating the client block state indicator.

36. The storage medium of claim 35, further comprising the steps of:

storing a semaphore identification in the client, the semaphore identification identifying at least one resource which is claimed by a process residing on the client;

reconnecting the client to the file server after a network fault occurs; and then submitting the semaphore identification to the file server to reclaim at least one resource after a network fault occurs.

37. The storage medium of claim 35, further comprising the steps of:

reconnecting the client to the file server after the network fault occurs;

determining that the client block state indicator indicates that server-caching is complete and that storing is not complete; and changing the client block state indicator to indicate instead that client-caching is complete and that server-caching is not complete.

38. The storage medium of claim 37, wherein the reconnecting step is followed by the step of re-establishing a client directory with the server.

39. The storage medium of claim 37, wherein the reconnecting step is followed by the step of re-opening a file that is stored on the server store.

40. The storage medium of claim 37, wherein the reconnecting step is followed by the step of creating a new instance of a file that is stored on the server store.

41. The storage medium of claim 37, wherein the reconnecting step is followed by the step of truncating a file that is stored on the server store.

42. The storage medium of claim 35, wherein the network fault occurs after the step of indicating that server-caching is complete and before the step of indicating that storing is complete, and wherein the method further comprises the following steps after the step of indicating that server-caching is complete and before the step of indicating that storing is complete:

reconnecting the client to the file server; and then trying again to store the file data by performing the steps of server-caching, indicating that server-caching is complete, requesting storage, and receiving an acknowledgement, regardless of whether any of those steps were also performed before the network fault occurred.

43. The storage medium of claim 35, wherein the client-caching step occurs in response to a disk write-through requesting step by a process that resides on the client, and the method further comprises the steps of:

suspending execution of the process after the disk write-through requesting step; and resuming execution of the process after the step of indicating that storing is complete.

44. The storage medium of claim 43, further comprising the step of sending the file server a rush signal corresponding to the file data, the rush signal being sent before the resuming step.

45. The storage medium of claim 35, wherein the file data is destined for storage in a file on the non-volatile medium in the file server, and the method further comprises the steps of:

storing an instance identification of the file on the non-volatile medium in the file server;

updating an instance identification of the file in the client cache after the server-caching step; and comparing the instance identification in the client cache with the instance identification stored on the non-volatile medium after a network fault occurs to determine whether the instance identifications correspond to one another.

46. The storage medium of claim 45, further comprising the step of updating the instance identification stored on the non-volatile medium after the step of receiving an acknowledgement from the controller, the updating making the instance identification on the non-volatile medium correspond to the instance identification in the client cache.

47. The storage medium of claim 45, wherein the steps of storing an instance identification and updating an instance identification comprise storing a modification count and updating a modification count, respectively.

48. The storage medium of claim 45, wherein the comparing step determines that the instance identifications do not correspond to one another and that the file was not modified after the network fault occurred, and wherein the method further comprises the step of trying again to store the file data by performing the steps of server-caching, indicating that server-caching is complete, requesting storage, and receiving an acknowledgement, regardless of whether any of those steps were also performed before the network fault occurred.

49. The storage medium of claim 45, wherein the comparing step determines that the instance identifications do not correspond to one another and that the file was modified after the network fault occurred, and wherein the method further comprises the step of notifying a user that the file was modified.

50. The storage medium of claim 45, wherein the comparing step determines that the instance identifications do not correspond to one another and that the file was modified after the network fault occurred, and wherein the method further comprises the step of storing the file data in a new instance of at least a portion of the file.

51. The storage medium of claim 50, wherein the step of storing the file data in a new instance comprises performing the steps of server-caching, indicating that server-caching is complete, requesting storage, and receiving an acknowledgement, regardless of whether any of those steps were also performed before the network fault occurred.

52. The storage medium of claim 35, wherein the file data is destined for storage in a file on the non-volatile medium in the file server, and the method further comprises the steps of:

storing a lock identification of the file in the client, the lock identification identifying at least one lock region of the file;

reconnecting the client to the file server after a network fault occurs; and then relocking the lock region of the file.

53. The storage medium of claim 52, wherein the relocking step is followed by the steps of:

determining that the client block state indicator indicates that server-caching is complete and that storing is not complete; and changing the client block state indicator to indicate instead that client-caching is complete and that server-caching is not complete.

54. The storage medium of claim 52, wherein the relocking step is followed by the step of performing the steps of server-caching, indicating that server-caching is complete, requesting storage, and receiving an acknowledgement, regardless of whether any of those steps were also performed before the network fault occurred.

* * * * *